US012780077B2

(12) United States Patent
Aftanas et al.

(10) Patent No.: US 12,780,077 B2
(45) Date of Patent: Nov. 3, 2026

(54) ARTICLE CARRIER SYSTEM FOR USE WITH PICKUP TRUCKS

(71) Applicants: JAC Products, Inc., Saline, MI (US); Ford Global Technologies, LLC, Dearborn, MI (US)

(72) Inventors: Jeffrey M. Aftanas, Ortonville, MI (US); Michael J. Presley, Plymouth, MI (US); Samuel D. Wells, Brighton, MI (US); Michael R. Makin, Waterford, MI (US); Daniel Trentin, Ivanhoe (AU); Nikhil Tribhuvan, Craigieburn (AU)

(73) Assignees: Ford Global Technologies, LLC, Dearborn, MI (US); JAC Products, Inc., Saline, MI (US)

( * ) Notice: Subject to any disclaimer, the term of this patent is extended or adjusted under 35 U.S.C. 154(b) by 275 days.

(21) Appl. No.: 18/292,377

(22) PCT Filed: Sep. 8, 2022

(86) PCT No.: PCT/US2022/042831
§ 371 (c)(1),
(2) Date: Jan. 26, 2024

(87) PCT Pub. No.: WO2023/043650
PCT Pub. Date: Mar. 23, 2023

(65) Prior Publication Data

US 2025/0074289 A1 Mar. 6, 2025

Related U.S. Application Data

(60) Provisional application No. 63/245,546, filed on Sep. 17, 2021.

(51) Int. Cl.
*B60P 7/02* (2006.01)
*B60R 9/06* (2006.01)

(52) U.S. Cl.
CPC . *B60P 7/02* (2013.01); *B60R 9/06* (2013.01)

(58) Field of Classification Search
USPC .................................................... 296/3, 37.6
See application file for complete search history.

(56) References Cited

U.S. PATENT DOCUMENTS 4,345,862 A * 8/1982 Blout ........................ B60P 7/14
49/503
5,121,959 A * 6/1992 King ......................... B60R 9/00
224/310

(Continued)

OTHER PUBLICATIONS

International Search Report and written Opinion for International Application No. PCT/US2022/042831.

*Primary Examiner* — Amy R Weisberg
*Assistant Examiner* — Veronica M Condo
(74) *Attorney, Agent, or Firm* — Vichit Chea; Carlson, Gaskey & Olds, P.C.

(57) ABSTRACT

The present disclosure relates to an article carrier system configured for use with a motor vehicle, in particular a pickup truck, and corresponding methods. The features described herein permit a user to use a slidable rear support to carry articles above the cargo area of a pickup truck, and allow for relatively easy repositioning of the rear support to accommodate articles of various sizes. Further, the features described herein do not interfere with use of the cargo area when the rear support is not being used to support articles thereon. This disclosure also allows for a smooth sliding motion of the rear support, while resisting if not eliminating vibrations.

20 Claims, 20 Drawing Sheets

(56) References Cited

U.S. PATENT DOCUMENTS

| | | | | | |
|---|---|---|---|---|---|
| 6,116,673 | A | 9/2000 | Clonan | | |
| 6,382,483 | B1 * | 5/2002 | Kleb | B60R 9/045 224/321 | |
| 6,464,277 | B2 * | 10/2002 | Wilding | B60R 9/00 224/404 | |
| 6,595,573 | B1 * | 7/2003 | Drasch | B60J 7/062 296/100.18 | |
| 8,100,615 | B1 | 1/2012 | Freeborn | | |
| 9,956,920 | B2 * | 5/2018 | Maguire | B60R 9/045 | |
| 10,071,692 | B2 * | 9/2018 | Kmita | B60R 9/05 | |
| 10,427,508 | B2 * | 10/2019 | Singer | B60J 7/065 | |
| 11,052,828 | B2 * | 7/2021 | Huisman | B60P 7/0815 | |
| 11,225,201 | B2 * | 1/2022 | Moulin | B60R 11/00 | |
| 2002/0020507 | A1 * | 2/2002 | Yorgason | E05D 15/063 160/199 | |
| 2007/0236035 | A1 | 10/2007 | Waldner | | |
| 2017/0096177 | A1 * | 4/2017 | Eddings, Jr. | B62D 33/0207 | |
| 2019/0061634 | A1 * | 2/2019 | Peruzzo | B60R 9/048 | |

* cited by examiner

ARTICLE CARRIER SYSTEM FOR USE WITH PICKUP TRUCKS

RELATED APPLICATION(S)

This application is a National Stage of International Application No. PCT/US2022/042831, filed Sep. 8, 2022, which claims the benefit of U.S. Provisional Application No. 63/245,546, filed Sep. 17, 2021. The entirety of the '831 and '546 applications are herein incorporated by reference.

TECHNICAL FIELD

The present disclosure relates to an article carrier system configured for use with a motor vehicle, in particular a pickup truck, and corresponding methods.

BACKGROUND

Pickup trucks typically include an enclosed cab and a cargo area (sometimes referred to as a cargo box, cargo bed, truck bed, or generally a "bed") having a bottom wall (sometimes called a floor or bed), side walls extending along opposite sides of the cargo area, and a tailgate. The tailgate typically swings relative to the side walls between an upright, closed position and a horizontal, open position.

SUMMARY

In some aspects, the techniques described herein relate to an article carrier system configured for use with a pickup truck, including: a rear support projecting above side walls of a cargo area of the pickup truck, wherein the rear support is slidable along the cargo area; a moveable handle configured to be grasped by a user, wherein the moveable handle is biased to a released position, and wherein, when a force is applied to the moveable handle, the moveable handle is configured to move to an actuated position; a cable moveable in response to movement of the moveable handle; a lock assembly configured to restrict movement of the rear support when the moveable handle is in the released position and to permit movement of the rear support when the moveable handle is in the actuated position; and a cam, wherein the cam is configured to transmit movement of the cable to the lock assembly, and wherein the cam is configured to require a lesser force from the user to hold the moveable handle in the actuated position than to move the moveable handle from the released position.

In some aspects, the techniques described herein relate to an article carrier system, further including a torsion spring urging the cam in a direction that applies a force to the cable and the moveable handle such that the moveable handle is urged toward the released position.

In some aspects, the techniques described herein relate to an article carrier system, wherein the torsion spring includes a leg arranged in a well formed in the cam.

In some aspects, the techniques described herein relate to an article carrier system, further including: a track arranged along a side wall of the cargo area, wherein the track includes a plurality of openings; and a trolley connected to the rear support and arranged within the track, wherein the trolley includes a plurality of openings; wherein the lock assembly includes a locking pin supported by the trolley and configured to selectively project out of one of the openings of the trolley and into one of the openings of the track when the moveable handle is in the released position.

In some aspects, the techniques described herein relate to an article carrier system, further including: a plurality of wedge actuators supported within horizontally-arranged openings of the trolley; and a plurality of wedge blocks configured to interface with a corresponding one of the wedge actuators to selectively project out of a corresponding vertically-arranged opening of the trolley when the moveable handle is in the released position.

In some aspects, the techniques described herein relate to an article carrier system, wherein: each wedge block includes a bottom surface inclined at a non-parallel angle relative to a top surface thereof; and each wedge actuator includes a surface configured to engage the bottom surface of a corresponding wedge block and inclined such that horizontal movement of the wedge actuator results in vertical movement of the corresponding wedge block.

In some aspects, the techniques described herein relate to an article carrier system, wherein a bottom surface of each wedge actuator includes an pad of material different than a remainder of the wedge actuator.

In some aspects, the techniques described herein relate to an article carrier system, wherein a top surface of each wedge block is made of plastic.

In some aspects, the techniques described herein relate to an article carrier system, further including: a first pivot bar connected to a first one of the wedge actuators; a second pivot bar connected to the locking pin; and a third pivot bar connected to a second one of the wedge actuators, wherein the second pivot bar includes a cam follower configured to contact the cam, wherein the second pivot bar is arranged relative to the first and third pivot bars such that rotation of the second pivot bar by the cam is configured to rotate the first and third pivot bars.

In some aspects, the techniques described herein relate to an article carrier system, wherein: the trolley includes first, second, third, and fourth rollers, each of the first, second, third, and fourth rollers is configured to rotate about a respective axis non-parallel relative to both a vertical axis of the track and a horizontal axis of the track, the first roller is adjacent a first end of the trolley, the second roller is between the first wedge actuator and the locking pin, the third roller is between the locking pin and the second wedge actuator, and the fourth roller is adjacent a second end of the trolley opposite the first end.

In some aspects, the techniques described herein relate to an article carrier system, wherein: the cam includes a first curved section having a radius corresponding to a radius of the cam follower, and when the moveable handle is in the released position, the first curved section is in contact with the cam follower.

In some aspects, the techniques described herein relate to an article carrier system, wherein the first curved section is concave when the cam is viewed from an exterior perspective.

In some aspects, the techniques described herein relate to an article carrier system, wherein, when the first curved section is in contact with the cam follower, the locking pin is able to project into an opening in the track and first and second ones of the wedge blocks are urged into contact with an upper wall of the track by the first and second wedge actuators.

In some aspects, the techniques described herein relate to an article carrier system, wherein: the cam includes a second curved section adjacent the first curved section, and when the cam is rotated such that the second curved section is in contact with the cam follower, the cam is configured to apply force to the locking pin to withdraw the locking pin from an opening in the track and to apply forces to the first and second wedge actuators such that first and second ones of the wedge blocks are spaced-apart from the upper wall of the track.

In some aspects, the techniques described herein relate to an article carrier system, wherein the second curved section is convex when the cam is viewed from an exterior perspective.

In some aspects, the techniques described herein relate to an article carrier system, wherein: the cam includes a third curved section adjacent the second curved section, and when the cam is rotated such that the third curved section is in contact with the cam follower, the cam is configured to hold the locking pin such that the locking pin is withdrawn from an opening of the track and to hold the first and second wedge actuators such that the first and second wedge blocks are spaced-apart from the upper wall of the track.

In some aspects, the techniques described herein relate to an article carrier system, wherein: the third curved section is convex when the cam is viewed from an exterior perspective, and the third curved section exhibits a different contour than the second curved section.

In some aspects, the techniques described herein relate to an article carrier system, wherein the locking pin includes a tongue configured to project through an opening of a housing of the rear support in a direction toward the cargo area when the locking pin is withdrawn from an opening of the track.

In some aspects, the techniques described herein relate to an article carrier system, wherein: the moveable handle is a first of two moveable handles configured to be grasped by a user, the moveable handles are arranged on opposite sides of the rear support, both moveable handles are biased to a released position, and when a force is applied to move either one of the moveable handles to an actuated position, the rear support is slidable along the side walls.

In some aspects, the techniques described herein relate to an article carrier system, further including: a fixed rear support projecting above side walls of a cargo area of the pickup truck, wherein the rear support is mounted in a fixed location along the cargo area.

In some aspects, the techniques described herein relate to an article carrier system, wherein the rear support is configured to slide along the cargo area by a motive force provided by an electric motor.

In some aspects, the techniques described herein relate to an article carrier system, wherein the electric motor is activatable by a key fob of the pickup truck.

In some aspects, the techniques described herein relate to an article carrier system configured for use with a pickup truck, including: a rear support projecting above side walls of a cargo area of the pickup truck, wherein the rear support is slidable along the cargo area; a track extending along a side wall of the cargo area; and a trolley connected to the rear support and arranged within the track, wherein the trolley includes a plurality of rollers, wherein each of the rollers is configured to rotate about an axis non-parallel relative to both a vertical axis of the track and a horizontal axis of the track.

In some aspects, the techniques described herein relate to an article carrier system, wherein the trolley includes a body with a plurality of openings, and wherein each of the rollers is arranged within a respective one of the plurality of openings.

In some aspects, the techniques described herein relate to an article carrier system, wherein the rollers are spaced-apart from one another along a length of the trolley, and wherein each roller is configured to rotate about an axis non-parallel relative to an immediately adjacent one of the rollers.

In some aspects, the techniques described herein relate to an article carrier system, wherein each roller is configured to rotate about an axis that is a reflection of an axis of an immediately adjacent one of the rollers about the vertical axis.

In some aspects, the techniques described herein relate to an article carrier system, wherein each roller is configured to rotate about an axis that is parallel to an axis of a second-closest one of the rollers.

In some aspects, the techniques described herein relate to an article carrier system, wherein the trolley includes a plurality of fasteners securing the rollers to the trolley.

In some aspects, the techniques described herein relate to an article carrier system, wherein the fasteners are arranged about an axis of rotation of a respective one of the rollers.

In some aspects, the techniques described herein relate to an article carrier system, wherein each roller is configured to rotate about an axis inclined relative to the vertical axis by an amount within a range of 20°-60°.

In some aspects, the techniques described herein relate to an article carrier system, wherein each roller is configured to rotate about an axis inclined relative to the vertical axis by about 35°.

In some aspects, the techniques described herein relate to an article carrier system, wherein the plurality of rollers includes four rollers.

In some aspects, the techniques described herein relate to an article carrier system, wherein the track is substantially C-shaped and with an opening on a side of the track facing toward the cargo area.

In some aspects, the techniques described herein relate to an article carrier system, wherein: an upper wall of the track is curved, and a lower wall of the track is curved.

In some aspects, the techniques described herein relate to an article carrier system, further including: a wedge actuator supported within a horizontally-arranged opening of the trolley; and a wedge blocks configured to interface with the wedge actuator to selectively project out of a vertically-arranged opening of the trolley when a moveable handle of the rear support is in a released position, wherein two of the rollers and the wedge block together provide three points of contact with the track when the moveable handle is in the released position, and wherein the three points of contact are spaced-apart from one another.

BRIEF DESCRIPTION OF THE DRAWINGS

The drawings described herein are for illustrative purposes only of selected embodiments and not all possible implementations, and thus are not intended to limit the scope of the present disclosure.

Corresponding reference numerals indicate corresponding parts throughout the several views of the drawings, in which:

FIG. 14 illustrates a cam follower in contact with a first curved section of the cam;

FIG. 15 illustrates the cam follower transitioning to contacting a second curved section of the cam;

FIG. 16 illustrates the cam follower in contact with a second curved section of the cam;

FIG. 17 illustrates the cam follower in contact with a third curved section of the cam;

FIG. 18 illustrates the block contacting an upper surface of the track such that the wedge actuator and block are in a fully locked position;

FIG. 19 illustrates the block contacting an upper surface of the track with the wedge actuator having moved laterally relative to the fully locked position such that the block contacts the upper surface with a lesser force than in the fully locked position;

FIG. 20 illustrates the block spaced-apart from the upper surface of the track such that the wedge actuator and block are in a fully unlocked position;

DETAILED DESCRIPTION

Figure 1:
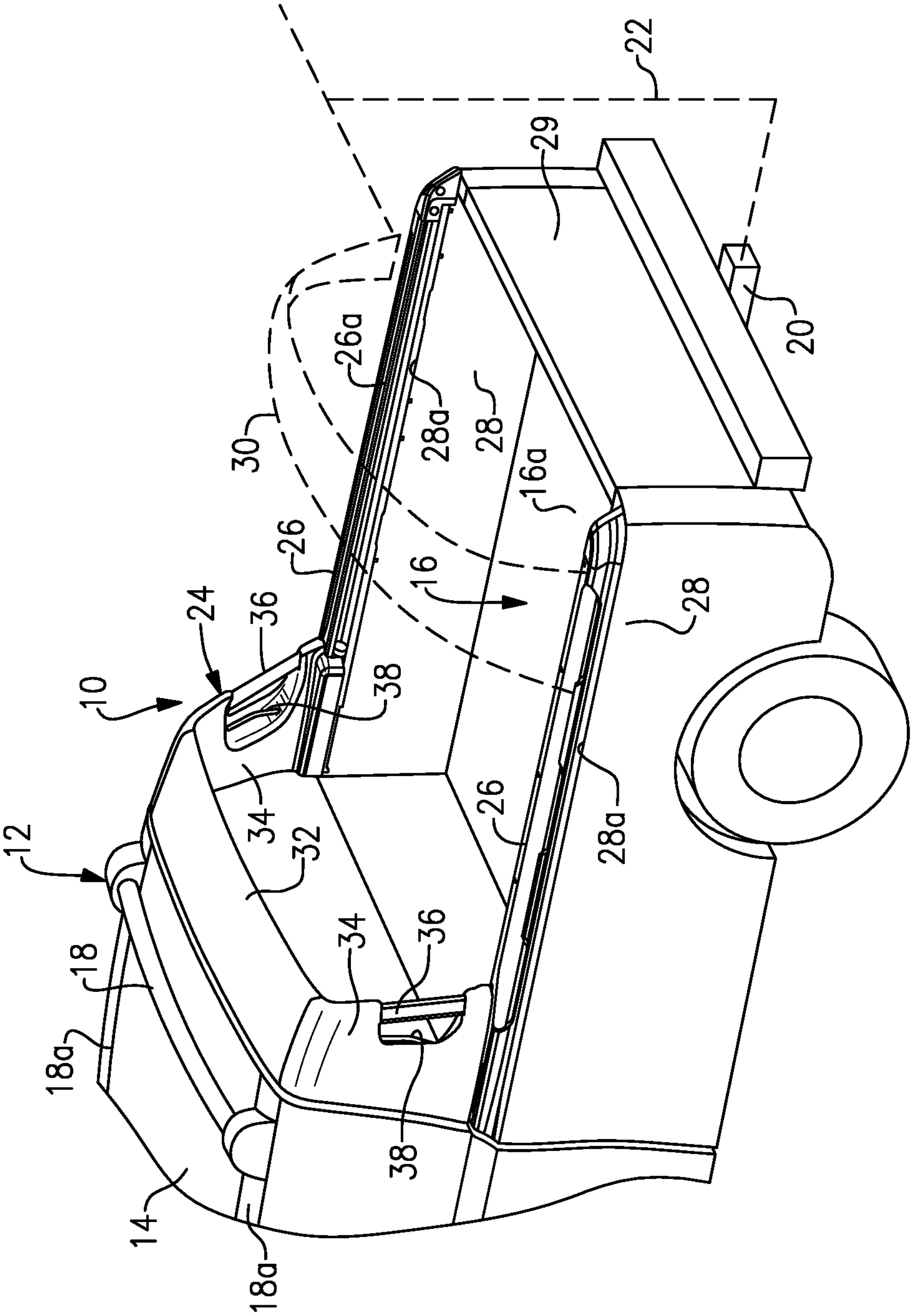
FIG. 1 is a perspective view of a vehicle article carrier system in accordance with one embodiment of the present disclosure, which is especially configured for use with a pickup truck, and in which an adjustably positionable rear support subsystem is positioned along a pair of support tracks in a forward-most position closely adjacent a rear window of a cab of the pickup truck.

Referring to FIG. 1, there is a shown an article carrier system 10 (hereinafter "system 10") configured for use with a motor vehicle 12, which in this example is a pickup truck. It will become apparent from the following discussion that the system 10 is especially well adapted for use with pickup trucks, which have a cargo area, or truck bed, 16 positioned behind a passenger cabin, or cab, 14. However, it will be appreciated that the system 10 could be implemented in connection with other vehicles, for example within a dedicated cargo compartment of a moving or delivery van, within a cargo aircraft, a cargo area of a ship, box car of a locomotive, etc., to help provide an elevated platform for supporting elongated articles above a floor of the compartment. Accordingly, the system 10 should be not be interpreted as being limited to use with only pickup trucks.

Optionally, as shown in FIG. 1, the system may make use of one or more conventional cross bars 18, or cross bar like elements, which are supported on a roof of the cab 14. The cross bar (or cross bars) 18 may be fixedly secured to roof of the cab 14 or may be positioned on roof rails, or support tracks, 18*a* (e.g., upwardly or sideways opening, substantially C-shaped tracks), and may include suitable locking mechanisms to lock the cross bar 18 (or cross bars) at a desired longitudinal position along the tracks 18*a*. If included, the cross bar(s) 18 may help to support articles above the roof of the cab 14. Optionally, the system 10 may also be used in connection with a T-shaped post 22 mounted in a receiver 20 to help support articles above a floor, which is sometimes called the bed, 16*a* of the truck bed 16. The system 10 is thus suited to be used with a wide range of other supporting implements which may be fixedly or removable attached to different portions of the vehicle 12.

Referring further to FIG. 1, the system 10 includes a rear support subsystem, or simply a rear support, 24 which is supported for movement along a pair of parallel support tracks 26. The rear support subsystem 24 may be referred to as a "sports hoop." The support tracks 26 in this example form substantially C-shaped tracks, when viewed in cross-section, with openings facing the truck bed 16 and which may be made from suitably high strength materials, such as aluminum, steel, etc. In this example, the support tracks 26 are fixedly secured to upper surfaces 28*a* of the side walls 28 of the truck bed 16. The side walls 28 project upward from the floor 16*a* and extend longitudinally between from the cab 14 to a tailgate 29.

Upper and lower walls of the support tracks 26 are curved and are concave when viewed from a perspective of an interior of the support tracks 26, in this example. A side wall of the support track 26 opposite the truck bed 16 may be a linear, vertical wall connecting the upper and lower walls of the support track 26. Despite the linear wall, the support tracks 26 are still considered substantially C-shaped.

The support tracks 26 are connected to the side walls 28 via conventional fasteners. In one implementation, the movement of the rear support subsystem 24 is a sliding or rolling movement along each support track 26. Optionally, it will be appreciated that the support tracks 26 could be mounted on the vertical inside wall portions of the side walls 28, rather than the upper surfaces 28*a*, such that the support tracks 26 are facing one another. In either instance, the rear support subsystem 24 is adjustably positionable and securable at a plurality of locations, defined by spaced apart holes 26*a* in each support track 26, along the length of each support track, as will be described in greater detail in the following paragraphs. The holes 26*a* in the two support tracks 26 are aligned such that one hole 26*a* from each support track 26 is aligned at common longitudinal locations along the support track 26 with a hole 26*a* from the other support track 26. The holes 26*a*, in some examples, are formed as through-holes extending through at least one wall of the support track 26. In other examples, the holes 26*a* are not formed as through-holes and are instead formed as recesses. The term "opening" is used in this disclosure as being inclusive of through-holes and recesses. The dashed line 30 indicates a rearward-most position of the rear support subsystem 24, which is the closest position to the tailgate 29 and may be particularly useful when using the rear support subsystem 24 to support relatively long articles. The rear support subsystem 24 may be selectively lockable in a particular quantity of intermediate positions between the forward-most position and the rearward-most position. In an example, the rear support subsystem 24 is selectively lockable in three distinct intermediate longitudinal positions in addition to the forward-most position and the rearward-most position, for a total of five distinct lockable positions. In this example, each support track 26 includes five holes 26*a* corresponding to the five distinct lockable positions.

The rear support subsystem 24 includes a central portion 32 extending laterally between two end support subassemblies 34, which generally project upward from the side walls 28. While only one rear support subsystem 24 is shown in FIG. 1, the system 10 is not limited to use with only a single rear support subsystem, but may also include a second movable rear support subsystem or a second fixedly secured rear support subsystem. If a second movable rear support subsystem is included, it may be identical in construction to the rear support subsystem 24, or it may differ in some details as dictated by a specific application. Further, the system 10 could include a structure similar to the rear support subsystem 24, which projects above the truck bed 16 and spans between the side walls 28 in a manner similar to the rear support subsystem 24, but is fixed in a particular location along the truck bed 16. In that embodiment, the rear support subsystem 24 would be slidable relative to that fixed structure to facilitate carrying various items above the truck bed 16. Still further, one or more electric motors and related controls may be integrated into the rear support subsystem 24 and/or on the vehicle 12 to provide a motive force to propel the rear support subsystem 24 without any manual force needed by the user. The electronic controls could be integrated into a keyfob for the vehicle 12, or provided on a separate control, and/or included in a suitable control panel inside the vehicle 12. The electronic control system used to control movement of the rear support subsystem 24 may include predetermined longitudinal positions, such as fully forward (i.e., the forward-most position) or fully rearward (i.e., the rearward-most position), along with one or more intermediate positions, that the user may select from the keyfob or other form of user control.

The rear support subsystem 24 may function as a spoiler when in the forward-most location, as shown in FIG. 1, by deflecting air flowing over the sides and top of the cab 14, thereby making the vehicle more aerodynamic.

With further reference to FIG. 1, the end support subassemblies 34 may be of identical (or substantially identical) construction and, with the central portion 32, enable the rear support subsystem 24 to form a single, rigid subassembly which can be rolled along the support tracks 26 while standing on either side of the vehicle 12, or while standing in the truck bed 16.

Each end support subassembly 34 includes a fixed handle 36 and a moveable handle 38. As will be described in greater detail in the following paragraphs, a user may partially grasp one of the fixed handles 36 with a palm of their hand, and fully squeeze the moveable handle 38 towards the fixed handle 36 using their fingers, which simultaneously releases an internal locking subsystem within both of the two end support subassemblies 34, which then allows the user to slide the rear support subsystem 24 along the support tracks to a different longitudinal position suitable for supporting the article or load that the user is anticipating placing on the rear support subsystem 24, for example.

The internal locking mechanism within each end support subassembly 34 will engage with one of a plurality of spaced apart holes 26*a* formed in the support tracks 26, and once the user releases the moveable handle 38, locking of each of the internal locking mechanisms with the two end support subassemblies 34 will occur simultaneously or substantially simultaneously. Thus, unlocking, repositioning of the rear support subsystem 24 along the support tracks 26, and locking of the end support subassemblies 34 can be accomplished while standing along one side of the vehicle. There is no need for the user to unlock one side of the rear support subsystem 24, then walk to the other side of the vehicle and unlock the rear support subsystem 24 at that side from the other support track 26, and then reposition the rear support subsystem along the support tracks. Nor is there a need for two users to coordinate with one another to reposition the rear support subsystem 24. All of these operations can be done conveniently and efficiently from either side of the vehicle 12 by a single user.

Optionally, the rear support subsystem 24 may include one or more attachment points where an external pad or other form of support element may be secured, to raise the height of the central portion 32 of the rear support subsystem 24 to a level matching that of the cross bar 18, if needed, such as if the height of the rear support subsystem 24 is level with the roof of the cab 14. The attachment section or implement may also permit attachment of other article securing mounting elements (e.g., bicycle carrier, kayak carrier, etc.) as need to help support an article above the bed, and/or above the height of the roof of the cab 14.

Figure 2:
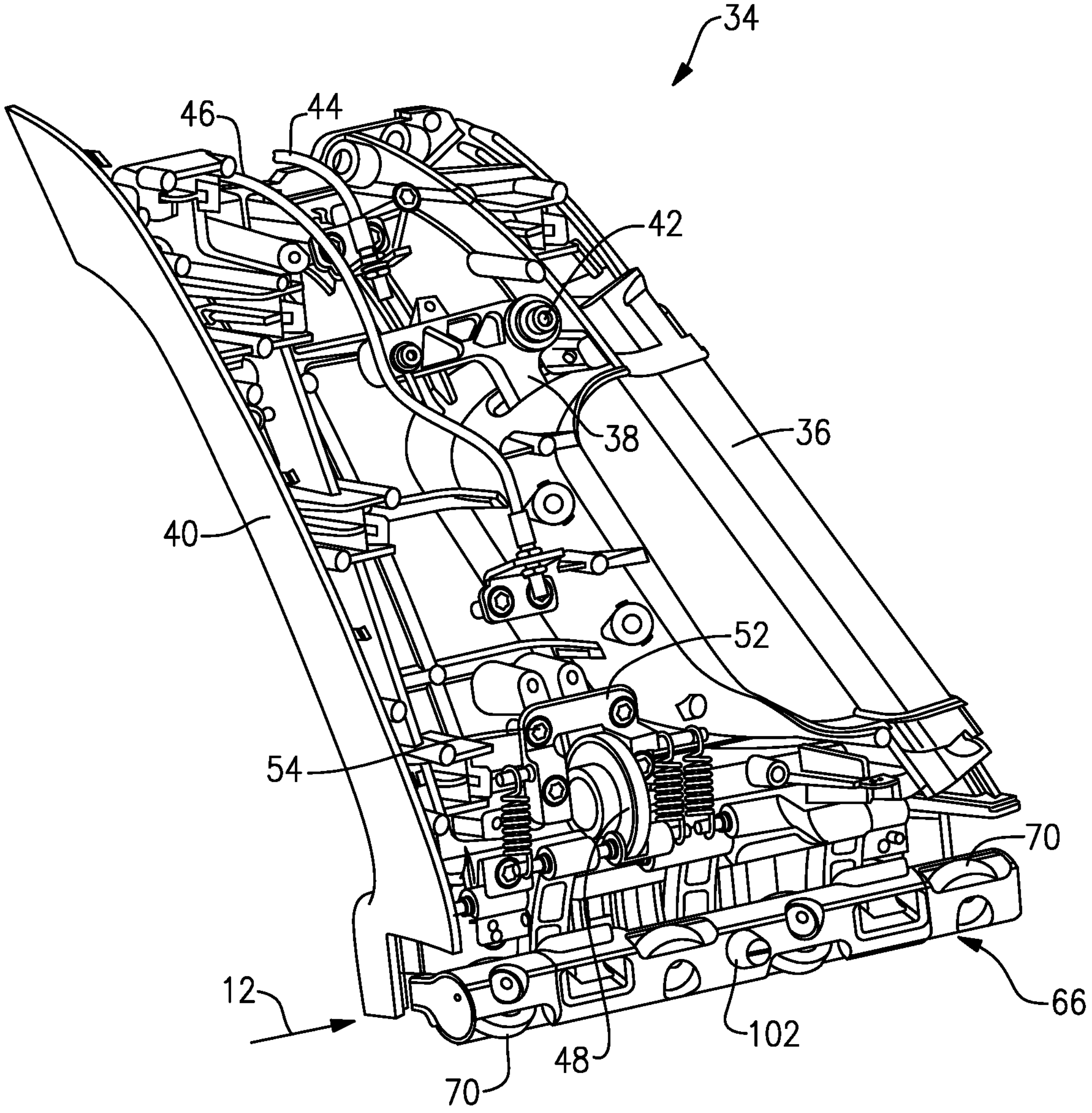
FIG. 2 is a perspective view of one of the end support subassemblies of the rear support subsystem with a portion of the housing removed to reveal various components of the rear support subsystem housed therein, and in particular a trolley subsystem which enables rolling movement of the end support subassembly along its associated support track.
Figure 3:
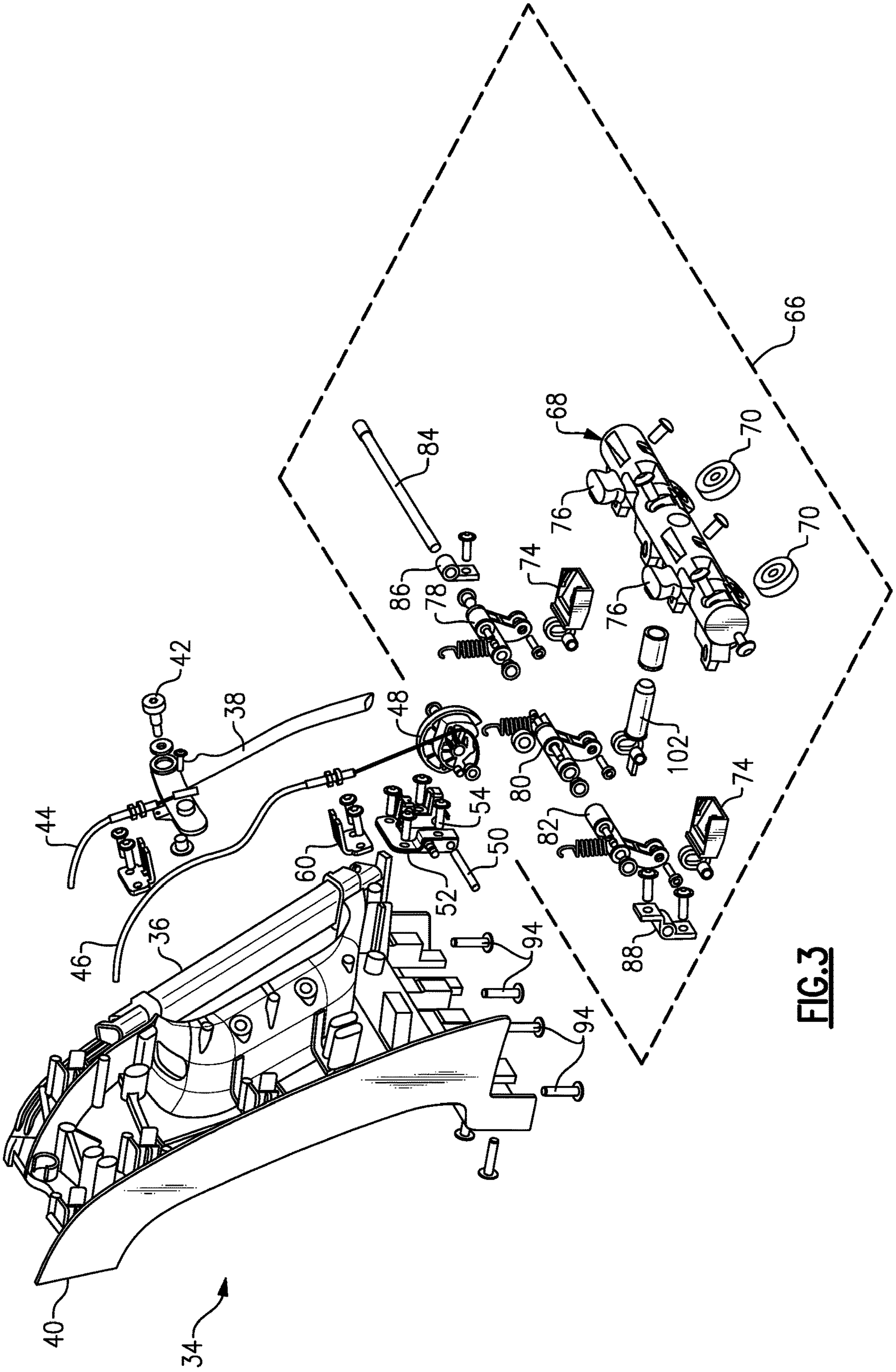
FIG. 3 is an exploded perspective view of the components within the end support subassembly of FIG. 2, and in particular the components of the trolley subsystem and the components of a camming system used in connection with the trolley subsystem.
Figure 4:
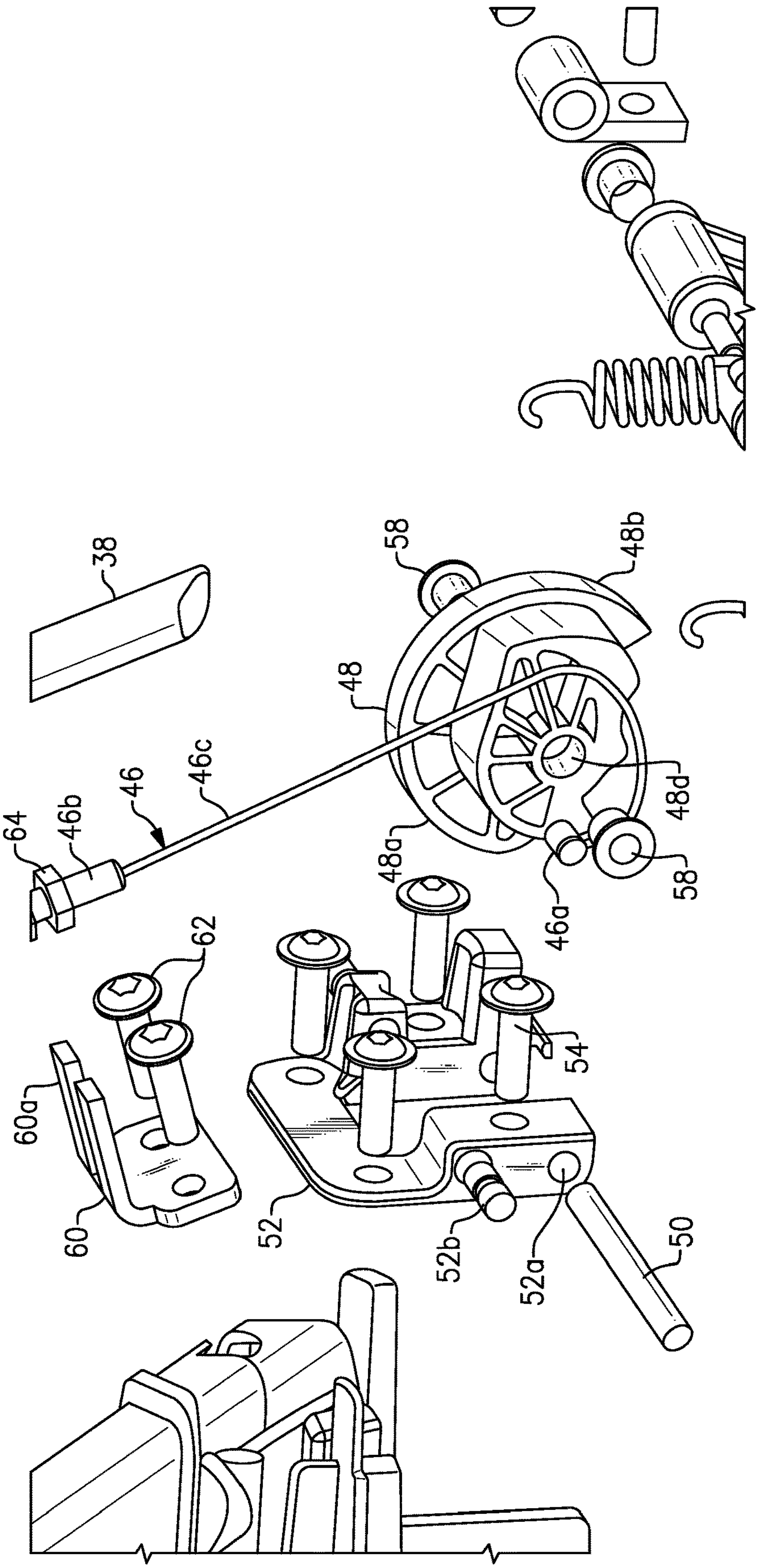
FIG. 4 is an enlarged, exploded perspective view of various components shown in FIG. 3, and in particular one side of a cam which is used to control the locking and wedging actions provided by the trolley subsystem.

Referring to FIGS. 2-4, various internal components within one of the end support subassemblies 34 can be seen in detail. In this regard it will be appreciated that the internal construction of the two end support subassemblies 34 may be identical, or nearly identical, and as such only the driver's side end support subassembly 34 is shown in FIG. 2. The term "driver's side" refers to the driver's side in geographic regions such as North America and is not otherwise intended to be limiting.

The end support subassembly 34 includes an outer housing 40, all or part of which may be made from die cast aluminum or another material such as fiberglass, steel, magnesium, etc. The outer housing 40 may be a two part assembly, with one part being removed in FIG. 2, and which may be formed from plastic or a different material, to enclose the various components shown in FIGS. 2 and 3.

The moveable handle 38 is pivotally coupled by a suitable fastener 42 to a portion of the housing 40. A first cable 44 is coupled at one end to the moveable handle 38, and extends into the central portion 32 of the rear support subsystem 24. A second cable 46 is operably coupled to a cam 48 which is rotationally mounted on an axle 50, with the axle 50 being supported within a pair of parallel bores 52*a* of an inverted U-shaped mounting bracket 52, which itself is secured to an interior wall portion of the housing 40 by fastening elements 54.

The cam 48 is configured to transmit movement of the cable 46 to a lock assembly including locking pin 102, as discussed below. The two cables 44 and 46 may be arranged to achieve a simultaneous unlocking action, and a simultaneous locking action, at both of the end support assemblies 34, when either one of the moveable handles 38 is grasped or released.

The moveable handle 38 is biased to a released position when external forces are not applied to the moveable handle 38, and in the released position movement of the rear support subsystem 24 is able to be restricted once a locking pin projects into a corresponding opening, as will be discussed below. When a force is applied by a user grasping the moveable handle 38, overcoming the bias to the released position, the moveable handle 38 moves to an actuated position in which movement of the rear support subsystem 24 is permitted. Because the rear support subsystem 24 can be moved by merely actuating one of the moveable handles 38 as opposed to simultaneously activating both moveable handles 38, this disclosure may be said to provide a "single side release."

The rear support subsystem 24 is not limited to any one particular construction of simultaneous locking/unlocking components, and those skilled in the art will recognize that other configurations of one or more cables may be used to cause simultaneous unlocking and unlocking of the end support assemblies 34 from either one of the moveable handles 38. Still further, even fully independent, separate locking subsystems could be used in the two end support subassemblies 34, although users may prefer the convenience of the single side release system.

Figure 5:
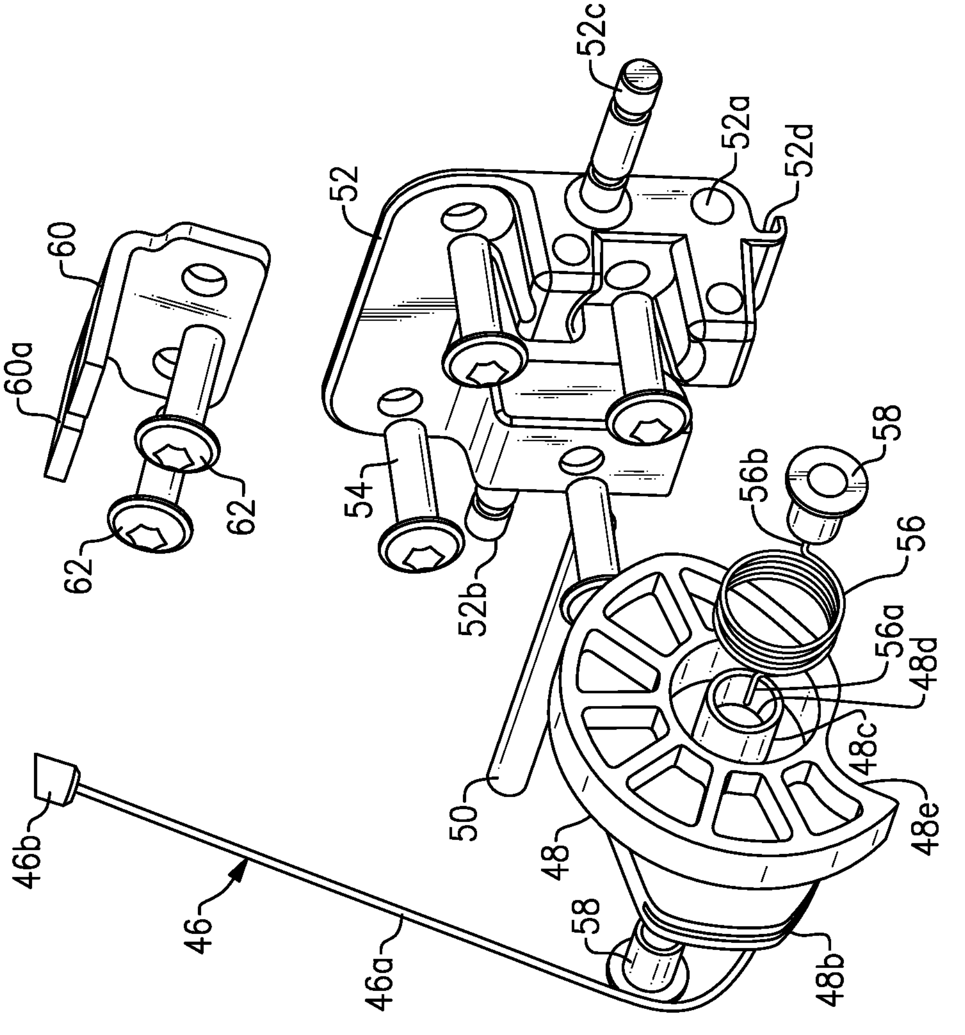
FIG. 5 shows various components of FIG. 4 but from the opposite orientation shown in FIG. 4.
Figure 22:
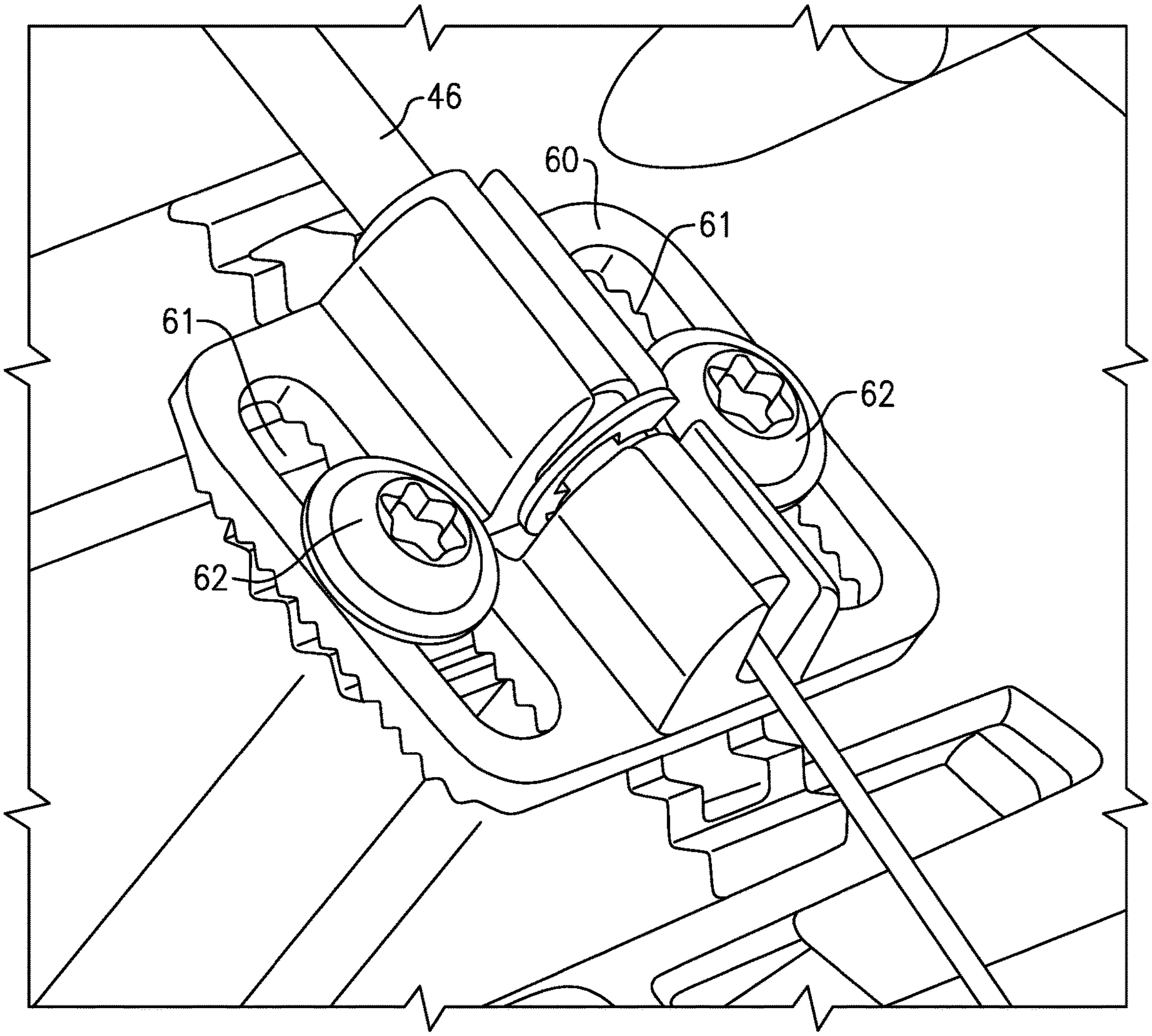
FIG. 22 illustrates another example cable guide arrangement.

With further reference to FIGS. 4 and 5, one end 46*a* of the cable 46 is coupled within an opening 48*a* of the cam 48 and extends within a slot 48*b* in the cam. FIG. 5 shows a torsion spring 56 which sits within a well 48*c* formed in the cam 48, and provides a constant biasing force on the cam 48, and in turn provides a biasing force on the moveable handle 38. One leg 56*a* of the torsion spring 56 is captured in a portion of the cam 48, and the other leg 56*b* is captured in a groove 52*d* of the mounting bracket 52. The constant biasing force provided by the torsion spring 56 pulls the moveable handle 38 toward the released position, and returns the moveable handle 38 in the released position once it is released by a user, thus simultaneously placing its associated end support subassembly 34 in a locked orientation. Bushings 58, which may be nylon bushings, receive the axle 50 and are positioned in opposite sides of a bore 48*d* of the cam 48 and help to provide smooth, relatively low-friction rolling movement of the cam 48 on the axle 50. A cable guide 60 may be secured to an inside wall portion of the housing 40 by conventional threaded fasteners 62, and used for capturing a nut 64 associated with the cable 46 in a slot 60*a* thereof. This disclosure extends to other arrangements of the cable guide and nut. In an example, the cable guide 60 could include longitudinally-extending slots 61 for receiving the fasteners 62, and the cable guide 60 could slide relative to the fasteners 62 to adjust the relative position of the cable 46, as generally shown in FIG. 22. The cable 46 in this example is a Bowden cable with an outer sleeve portion 46*b* (FIG. 4) that is held stationary by the cable guide 60, while an inner cable element 46*c* moves freely within the sleeve portion 46*b* as the moveable handle 38 is moved.

Figure 6:
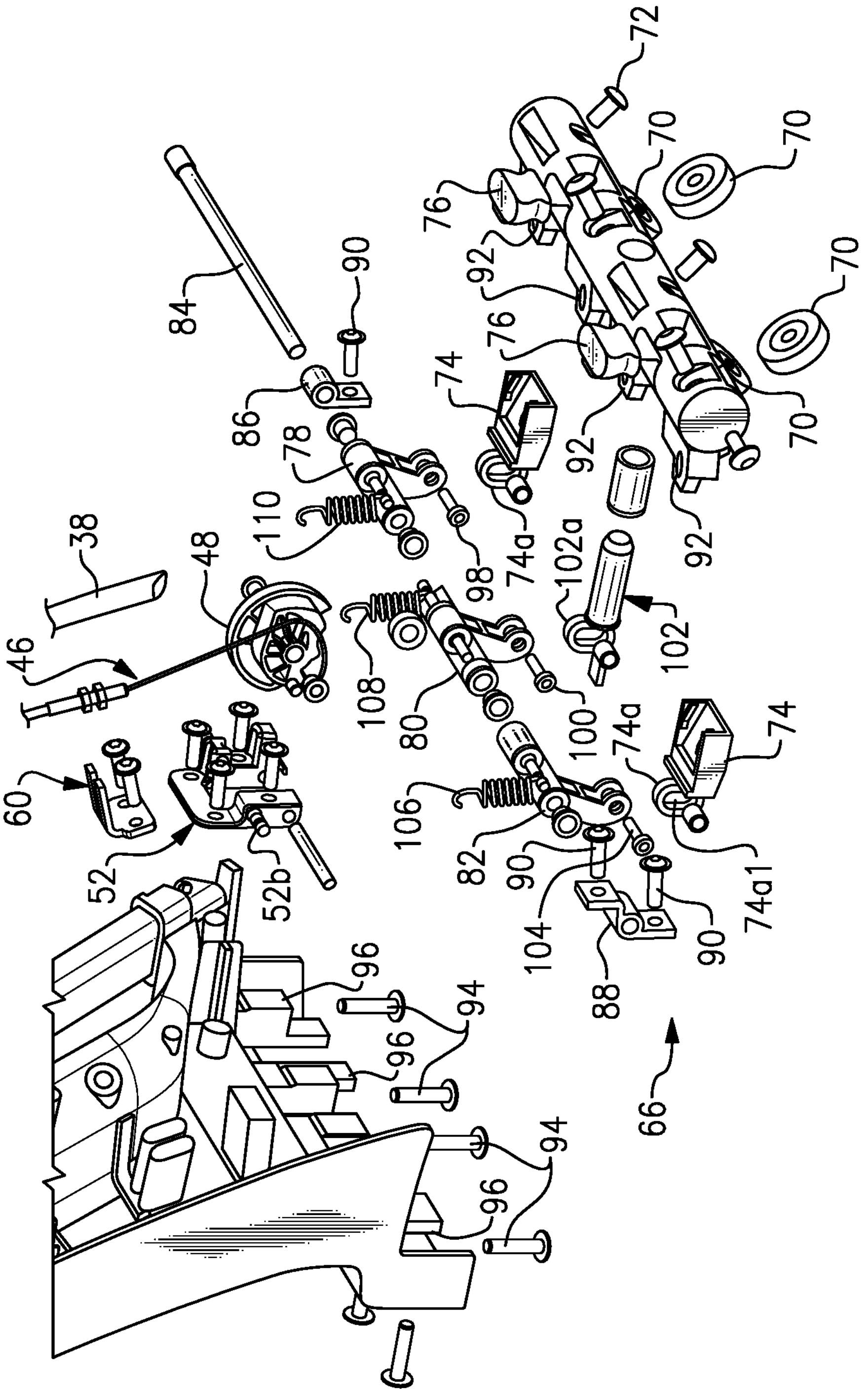
FIG. 6 is another enlarged exploded perspective view of the components of the trolley subsystem and the camming system.
Figure 7:
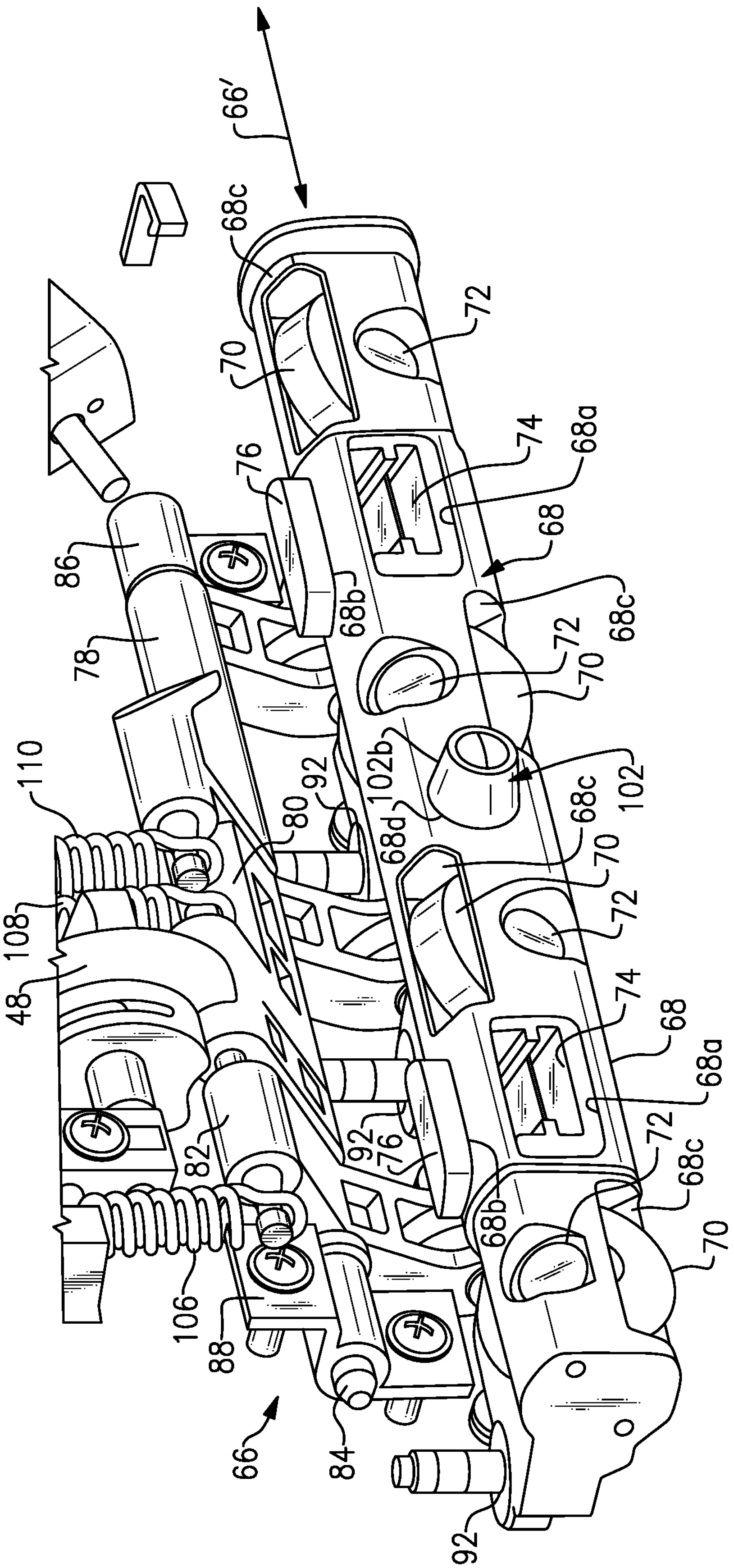
FIG. 7 is an enlarged, perspective view of the trolley subsystem in its fully assembled form, and also showing the engagement of the cam of the camming system with a cam follower portion of the trolley subsystem.
Figure 8:
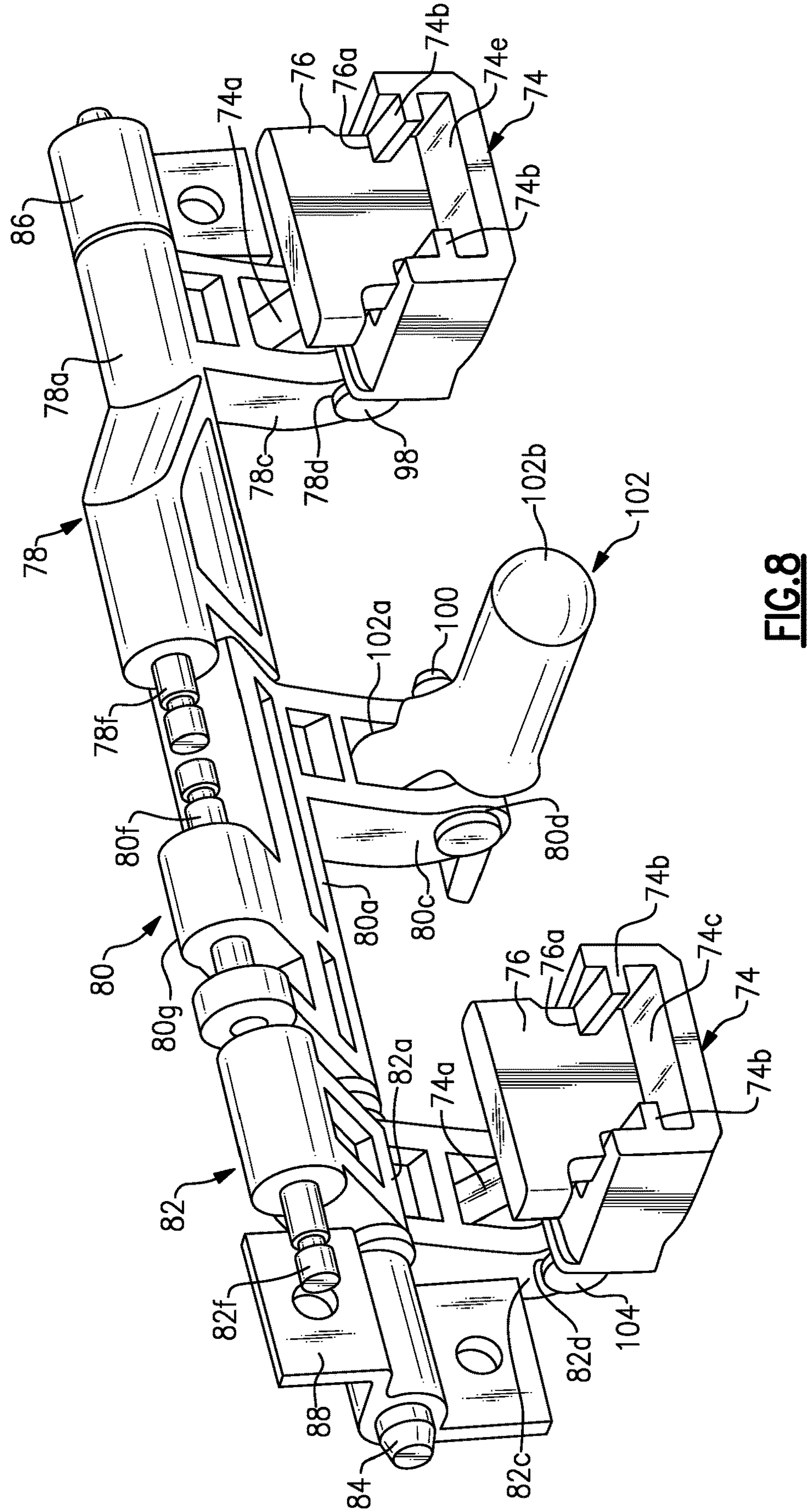
FIG. 8 is an enlarged perspective view of the three pivot bars, the two wedging subsystems, and the locking element of the trolley subsystem.

Referring further to FIG. 3 and also to FIGS. 6-8, a trolley subsystem, or simply a trolley, 66 is shown which enables relatively smooth, binding-free rolling movement of the end support subassembly 34, as well as attachment to its associated support track 26. In this regard the trolley subsystem 66 helps to reduce if not eliminate rattling that might otherwise occur between the end support subassembly 34 and the track 26 when the vehicle is travelling over bumpy or uneven terrain, due to the mass of the rear support subsystem 24, and/or the load being supported by the rear support subsystem.

The trolley subsystem 66 includes a body 68 with a plurality of openings for housing a plurality of rollers 70. The rollers 70 are secured via threaded fasteners 72 or another type of pin-like element that acts as an axle. In this example four rollers 70 are used. For example, the rollers 70 may each be steel rollers having a polymer overmold construction. The trolley subsystem 66 may be configured for use with another number of rollers 70, such as just two rollers 70 in some applications. Due to the mass of the rear support subsystem 24, three or more rollers 70 may provide optimal rolling movement of the rear support subsystem 24, while also preventing any binding of the end support subassemblies 34 as the user is moving the rear support subsystem 24 along the tracks 26.

With specific reference to FIGS. 6 and 7, the trolley subsystem 66 also includes a wedging subsystem formed using wedge actuators 74 and blocks 76. One wedge actuator 74 and one block 76 form a wedging subsystem at one longitudinal end of the body 68, while the other wedge actuator 74 and block 76 form a wedging subsystem at the opposite longitudinal end of the body 68. The wedge actuators 74 are positioned within horizontally-arranged openings 68*a* in the body 68, which are shaped similar to the cross-sectional shape of the wedge actuators 74. As such, each wedge actuator 74 is only able to move linearly, horizontally, along an axis which extends perpendicular to a longitudinal axis 66' (FIG. 7) extending through the trolley subsystem 66. The blocks 76 are each supported within vertically-arranged openings 68*b* in the body 68, which are shaped in accordance with the cross-sectional shape of the blocks 76, and which each open into communication with one of the horizontally arranged openings 68*a*. As such, linear horizontal movement of each wedge actuator 74 is able to cause a linear vertical movement of its associated block 76. The vertical openings 68*b* and the blocks 76 are further oriented such that they are aligned with a vertical axis passing through an axial center of the support track 26. Thus, this arrangement enables each block 76 and its two adjacent rollers 70 to provide three angularly spaced-apart points of contact with the interior wall of the support track 26, and these three points of contact are further spaced apart both radially and axially relative to the support track 26. The action of these components will be described in greater detail in the following paragraphs. Various components such as nylon bushings are also shown in the FIGS. 3 and 6, but have not been labelled for ease of reference. The use of such bushings where metal-to-metal contact would otherwise be made by two moving components helps to provide smooth pivoting motion of various ones of the components shown in FIGS. 3 and 6.

Figure 9:
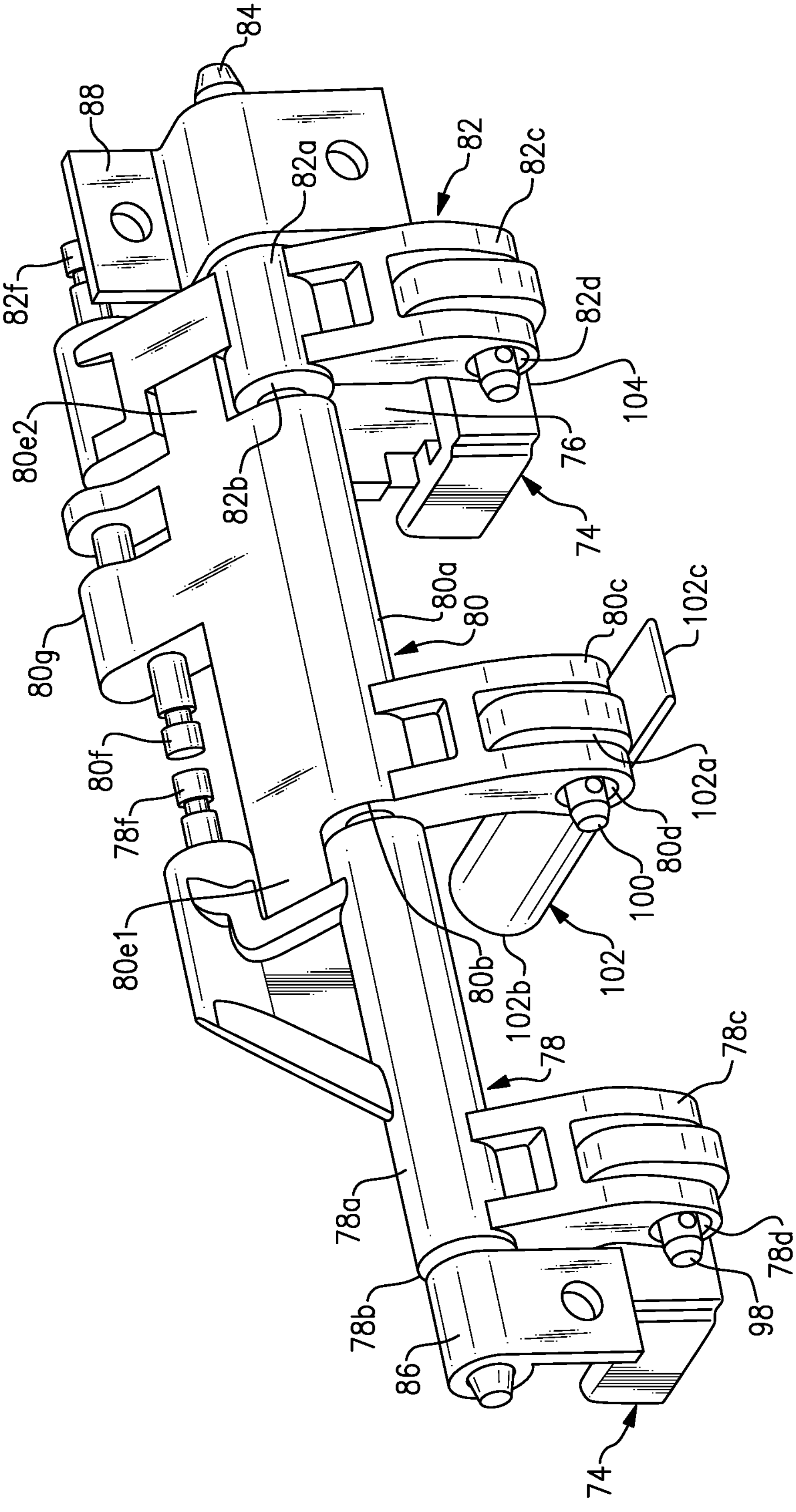
FIG. 9 is an enlarged perspective view of the components shown in FIG. 8 but from the opposite orientation.

With further reference to FIGS. 6-9, the trolley subsystem 66 further includes a first pivot bar 78, a second pivot bar 80, and a third pivot bar 82. As best shown in FIGS. 8 and 9, each of the pivot bars 78, 80, 82 include central portions 78*a*, 80*a* and 82*a* having bores 78*b*, 80*b* and 82*b*, respectively, through which a rod 84 extends. The rod 84 extends through bores in pivot brackets 86 and 88, such that the three pivot bars 78, 80, 82 are all independently pivotally supported on the rod 84. The pivot brackets 86 and 88 may be secured via threaded fasteners 90 (FIG. 6) to the inside wall portion of the housing 40 as shown in FIG. 2. The body 68 includes a plurality of four vertically-arranged bores 92 through which threaded fasteners 94 may extend to secure the body 68 to portions 96 on the inside wall portion of the housing 40.

With further reference to FIGS. 7, 8 and 9, each pivot bar 78, 80, 82 further includes a clevis portion 78*c*, 80*c* and 82*c*, respectively, as shown particularly well in FIGS. 8 and 9. The clevis portion 78*c* has a pair of aligned bores 78*d*. A coupling pin 98 extends through the aligned bores 78*d* and through an elongated opening in a coupling section 74*a* of one of the wedge actuators 74 (visible clearly in FIG. 11A). This pivotally couples the wedge actuator 74 to the clevis portion 78*c*, while still enabling linear movement of the wedge actuator 74. Similarly, the clevis portion 80*c* of the second pivot bar 80 includes a pair of aligned bores 80*d* which receives a coupling pin 100, with the coupling pin 100 also extending through an elongated coupling section 102*a* (best seen in FIG. 6) of a locking element, which in this example is a locking pin 102. This pivotally couples the second pivot bar 80 to the locking pin 102 while enabling linear movement of the locking pin 102. The locking pin 102 is positioned in a bore 68*d* in the body 68, as shown in FIG. 7, and includes a tapered nose 102*b* which enables a secure wedging engagement with one of the holes 26*a* (FIGS. 1 and 12) in the support track 26. Finally, the clevis portion 82*c* has a pair of aligned bores 82*d* which receive a coupling pin 104. The coupling pin 104 also extends through the elongated coupling section 74*a* of the other wedge actuator 74, which pivotally couples the other wedge actuator 74 thereto while still enabling linear movement of the other wedge actuator 74.

Figure 10:
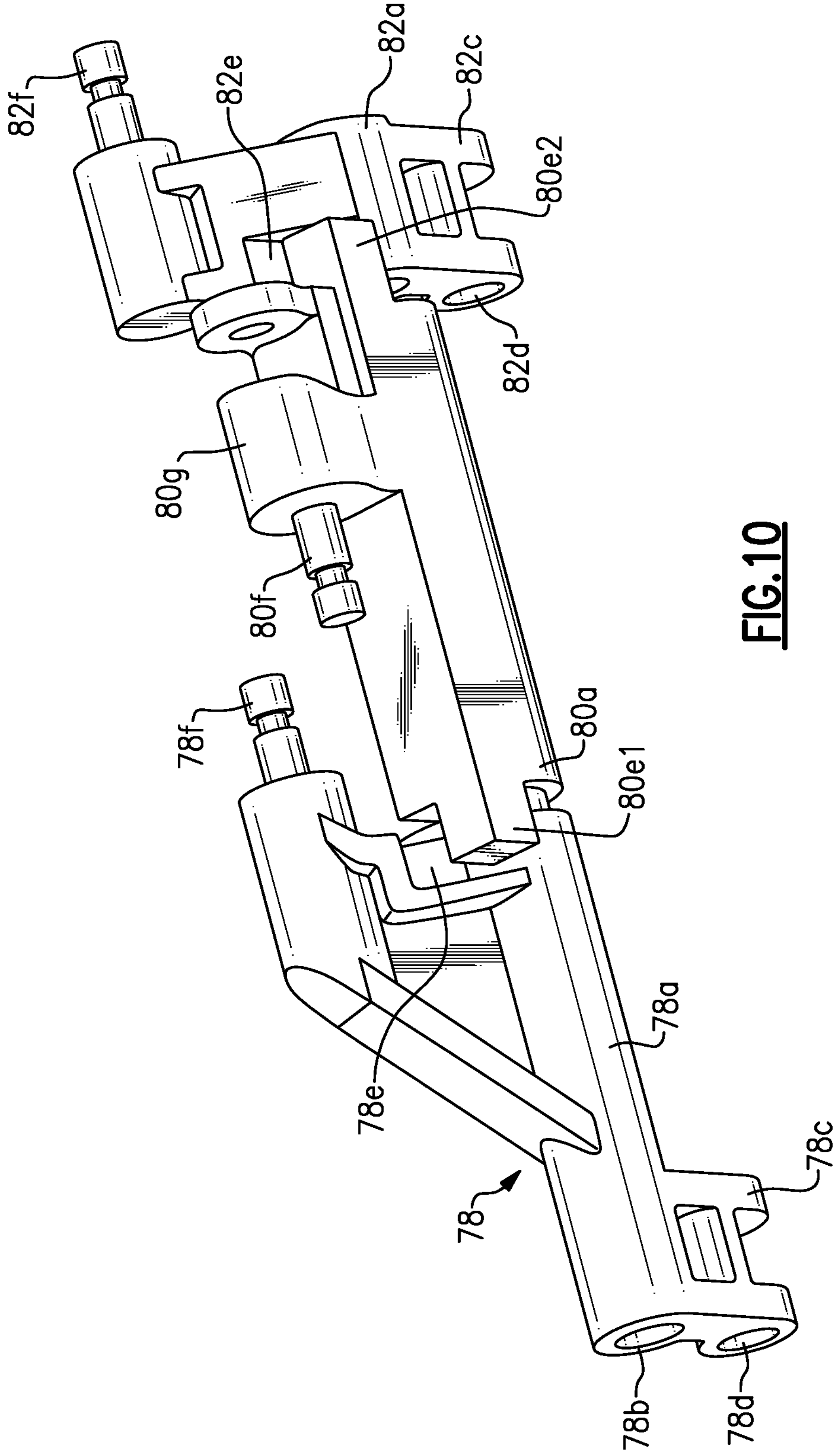
FIG. 10 is an enlarged perspective view of the three pivot bars of the trolley subsystem.

With reference to FIGS. 9 and 10, the second pivot bar 80 can be seen to include wings 80*e*1 and 80*e*2 at opposite ends thereof, which engage with surface portion 78*e* of pivot bar 78 and surface portion 82*e* of pivot bar 82. This enables rotational movement of the second pivot bar 80 to cause corresponding rotational movement of the first and third pivot bars 78 and 82, which enables simultaneous linear movement of the locking pin 102 and the two wedge actuators 74 when the moveable handle 38 is squeezed and moved into the actuated position by the user, while still enabling independent pivotal movement of the first and third pivot bars 78 and 82. This feature enables slight variations in the cross-sectional construction of the support tracks 26 to be accommodated, because when the moveable handle 38 is released, each of the pivot bars 78, 80, 82 can move rotationally, independently, as needed to effect full linear movement of the two wedge actuators 74, and complete movement of the locking pin 102 into engagement with one of the holes 26*a* in the support track 26.

The third pivot bar 82 has a leg 82*f* which is coupled via a spring 106 (FIG. 6) to a first lateral leg 52*b* (FIG. 5) of the mounting bracket 52, while springs 108 and 110 are used to couple legs 80*f* and 78*f* of the second pivot bar 80 and the first pivot bar 78, respectively, to the second lateral leg 52*c* of the mounting bracket. Thus, independent tension forces are provided by the springs 106-110 on the pivot bars 78, 80, 82, which also help to enable the pivot bars 78, 80, 82 to independently address any issues with dimensional variability along the lengths of the support tracks 26, or any other variability introduced by any other component(s) of the trolley subsystem 66.

Figure 11A:
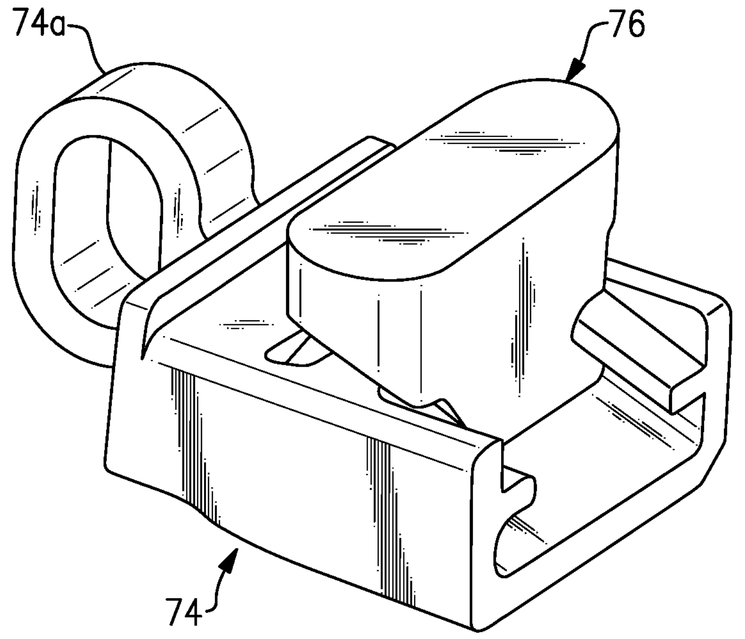
FIG. 11A is an enlarged perspective view of the engagement of the wedge actuator, block and body, which cooperatively form one of the wedging subsystems used on the trolley subsystem.
Figure 11B:
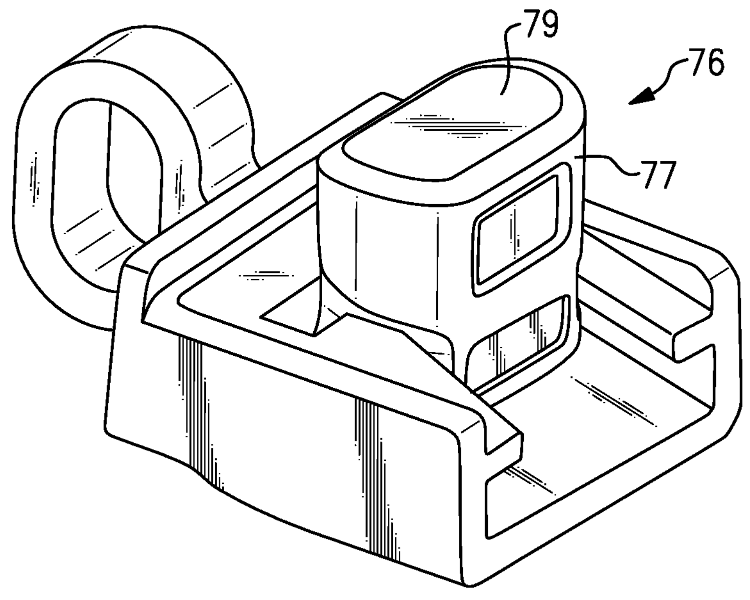
FIG. 11B is an enlarged perspective view of the engagement of another example of the wedge actuator, block and body.

With further reference to FIG. 8, the engagement of the wedge actuators 74 and the blocks 76 can also be seen. Each wedge actuator 74 includes inwardly extending flanges 74*b* and a tapered inner wall 74*c*. The flanges 74*b* receive channels 76*a* formed on opposing sides of its mating block 76. This enables linear horizontal movement of the wedge actuator 74 to cause vertical movement of its associated block 76. The blocks 76 may be of a length slightly longer (e.g., 1-2 mm) than needed to make secure contact with an interior wall portion of its associated support track 26, which may account for any variability in the cross-sectional dimension of the support track 26 along its full length. This provides a secure wedging action of the trolley subsystem 66 along the full length of the support track 26. FIG. 11A shows one of the wedge actuators 74 engaged with its associated block 76. As shown, the block 76 includes an angled bottom surface, which in this example is non-parallel to a top surface of the block 76 and corresponds to the angle of the tapered inner wall 74*c* (FIG. 8). The angle used on the tapered inner wall 74*c* may vary, but is preferably between about 10-30 degrees relative to the horizontal axis 114 and the undersurface of the wedge actuator 74, and may be about 20 degrees relative to the horizontal axis 114. FIG. 11B shows another arrangement of a block 76, which in this example is formed of a metallic material 77, such as aluminum, overmolded with anti-friction material, which here is a plastic material 79. Specifically, the plastic material 79 provides a top-most surface of the block 76, which may reduce wear of the block 76 by reducing metal-on-metal contact when the block 76 engages the track 26.

With reference to FIGS. 5, 7 and 9, the engagement of the cam 48 can be seen with a cam follower portion 80*g* of the second pivot bar 80. In FIG. 5 the cam 48 can be seen to include a curved section 48*e* which has a radius selected to approximately match a radius of the cam follower portion 80*g*. Curved section 48*e* is concave when the cam 48 is viewed from an exterior perspective. In this manner, rotational movement of the cam 48 causes a corresponding rotational movement of the second pivot bar 80, which in turn rotationally drives the first and third pivot bars 78 and 82. In this manner, both wedge actuator 74 and the locking pin 102 can be simultaneously moved out of engagement with the support track 26 when the user moves the moveable handle 38 into the actuated position, as well as all moved simultaneously into engagement with the support track when the user releases the moveable handle 38.

Figure 12:
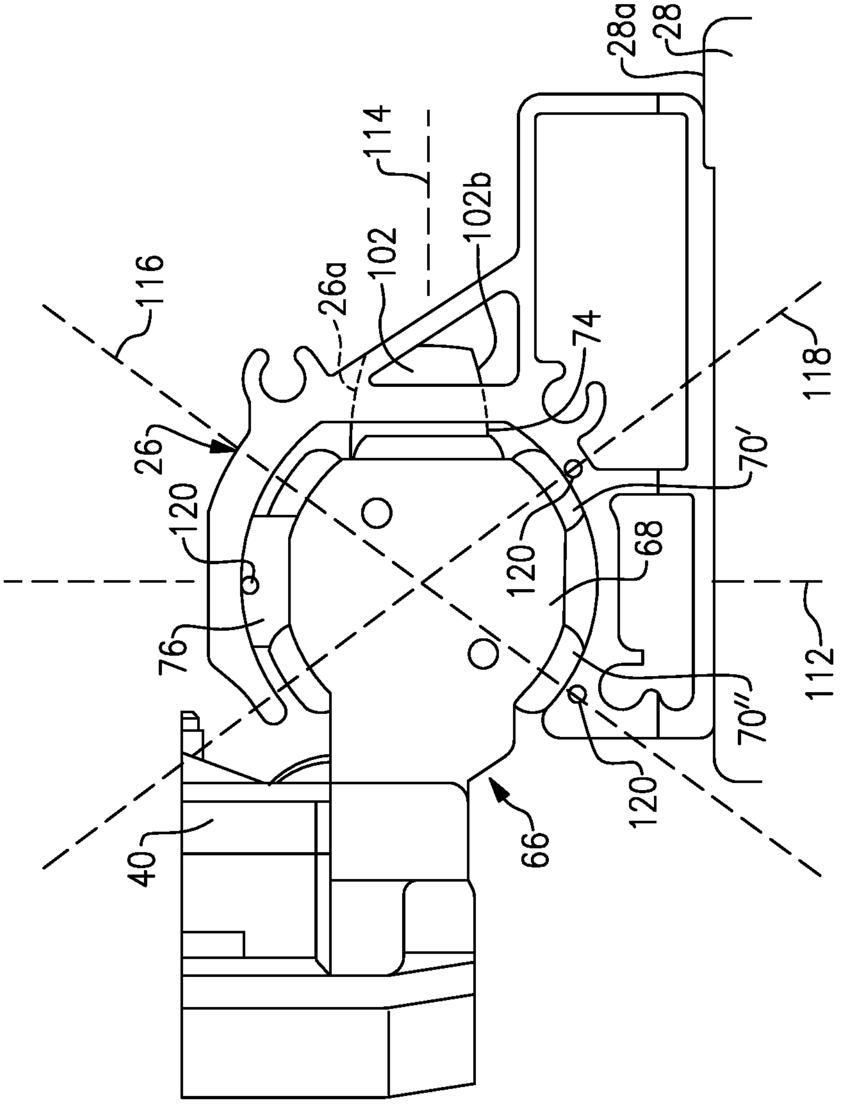
FIG. 12 is an end view in accordance with directional arrow 12 in FIG. 2 showing one of the trolley subsystems engaged with its respective support track.

With reference now to FIGS. 7 and 12, an arrangement of the rollers 70 will now be described. In this example, the rollers 70 are mounted such that they rotate about axes which are non-parallel to both vertical and horizontal axes 112, 114. In this disclosure, the vertical axis 112 divides the support track 26 into two lateral sides, and the horizontal axis 114 divides the support track 26 into two top and bottom sections. The vertical axis 112 passes through a middle of the support track 26 and is substantially perpendicular to the floor 16*a*. The horizontal axis 114 passes through the middle of the support track 26 and is substantially perpendicular to the vertical axis 114.

As shown in FIG. 12, one roller 70 has been denoted in this view by 70' and the immediately adjacent roller 70 is denoted by number 70". Roller 70' rotates about axis 116, which is non-parallel to both of the vertical and horizontal axes 112 and 114. Roller 70" is configured to rotate about axis 118, which is also non-parallel to both of the axes 112 and 114. Axes 116, 118 are reflections about axis 112, in this example. While adjacent rollers 70 are arranged about reflective axes, second-closest ones of the rollers 70 are arranged about parallel axes, in this example. The precise angles used for the rotational axes of the rollers 70 form at least somewhat of an X-shaped configuration, and the rollers 70 are in relative contact with the interior of the support track 26 helping to support the weight of the rear support subsystem 24. In an example, the axes 116, 118 are inclined by an angle within a range of 20°-60°, and in some implementations about 35°, relative to the vertical axis 112. In a particular embodiment, the axes 116, 118 are inclined by an angle of 37°. In another embodiment, the axes 116, 118 are inclined by an angle of 45°. These angles reduce if not eliminate binding of the trolley subsystems 66 and provide smooth sliding and rolling movement of the rear support subsystem 24 along the tracks 26 while moving the rear support subsystem from either side of the vehicle 12, while also permitting efficient packaging of the other components of the trolley subsystems 66. It will be appreciated, however, that the trolley subsystem 66 is not limited to use with the rollers 70 being mounted at any specific angle, and the precise angle selected for mounting the rollers 70 may vary depending on a number of factors, one of which may be the precise cross-sectional construction of the support track 26.

It will also be appreciated that while FIG. 7 illustrates the rollers 70 arranged in an alternating angular pattern such that no two adjacent rollers are mounted for rotation along a parallel angular axis, the present disclosure is not strictly limited to this configuration. For example, the mounting of the rollers 70 could be changed so that the two left most rollers 70 in FIG. 7 are supported for rotation along parallel axes, such as axis 116 in FIG. 12, while the right most two rollers are supported along parallel axes, such as axis 118. It is also possible that all four of the rollers 70 could be mounted along four slightly different angular axes, but where all four of the different angular axes are still non-parallel to both of the vertical and horizontal axes 112 and 114. Still further, it is also possible for one or more additional rollers to be included in the trolley subsystem 66 which is/are arranged parallel to one of the vertical or horizontal axes 112 and 114.

The X-shaped mounting configuration for the rollers 70 reduces if not eliminates binding of the trolley subsystems 66 when the user is pulling one side of the rear support subsystem 24 along the tracks 26, and a slight torque is being introduced along the central portion 32 of the rear support subsystem 24 which wants to "rack" the trolley subsystems 66 out of parallel alignment within their respective support tracks. The X-shaped mounting configuration of the rollers 70, especially when four rollers are used, enables at least two of the rollers of each of the trolley subsystems 66 to remain in rolling contact with the interior wall of the support track 26 at all times, regardless of the angular force vector force being applied to the rear support subsystem 24. The rollers 70 also reduce if not eliminate binding that might otherwise occur if the user is pulling or pushing the rear support subsystem 24 from one side while introducing a slight lifting action, which would otherwise tend to lift one end of one of the trolley subsystems 66. The longitudinally spaced apart rollers 70, with the X-shaped configuration described above, are equally effective in preventing the binding that could possibly otherwise occur under this condition. The X-shaped mounting configuration of the rollers 70 is thus effective at neutralizing a force vector introduced along any one or more of X, Y and Z axes, such that binding does not occur while trying to move the rear support subsystem 24 along the support tracks 26. More particularly, the alternating configuration of the rollers 70 along the body 68 of the trolley subsystem 66 helps to resist twisting of the rear support subsystem 24 in the support tracks 26 which could cause binding, and thus impede rolling movement of the rear support subsystem.

An additional feature of the trolley subsystem 66, mentioned briefly above, is the three distinct points of contact that are made by each block 76 and its two adjacent rollers 70, with the inside wall of the support track 26. This aspect of this disclosure is visible in FIG. 12. In FIG. 12 the small circles 120 designate regions of contact of the rollers 70' and 70", as well as a region of contact of the one block 76, with the inside wall surface of the support track 26. The three points of contact are thus spaced angularly apart from one another along three different, non-parallel axes. The three points of contact are also arranged near one longitudinal end of the trolley subsystem 66. The other block 76, which is not visible in FIG. 12, along with the other two rollers 70, which are also not visible in FIG. 12, form three additional points of contact in the same pattern as shown in FIG. 12, but near the other end of the trolley subsystem 66. These dual 3-point contact configurations near the opposing ends of the trolley subsystem 66 reduce if not eliminate rattling and vibration between the end support subassemblies 34 and the support tracks 26, as well as racking of the rear support subsystem 24. In effect, the three points of contact near each end of the trolley subsystem 66 are able to counteract and resist force vectors occurring in any one or more of the X, Y and Z planes, as the vehicle 12 travels over uneven terrain or makes sharp directional changes, regardless if the rear support subsystem 24 is unloaded or is loaded with articles such as cargo items. Even when unloaded, the mass of the rear support subsystem 24 may otherwise cause noise or vibration on uneven terrain, even with relatively small play or clearances between mechanical components of the rear support subsystem 24, but the three points of contact reduce if not eliminate that noise/vibration.

Figure 13:
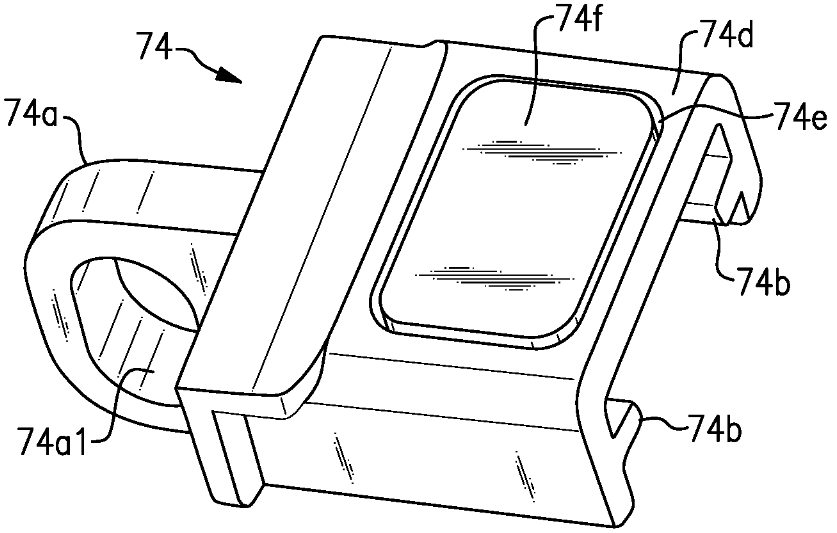
FIG. 13 is a perspective view of an undersurface of one of the wedge actuators showing a pad which provides a tunable coefficient of friction to help prevent sliding movement of the wedge actuator when the trolley subsystem is wedged within the support track during a locking action.
Figure 14:
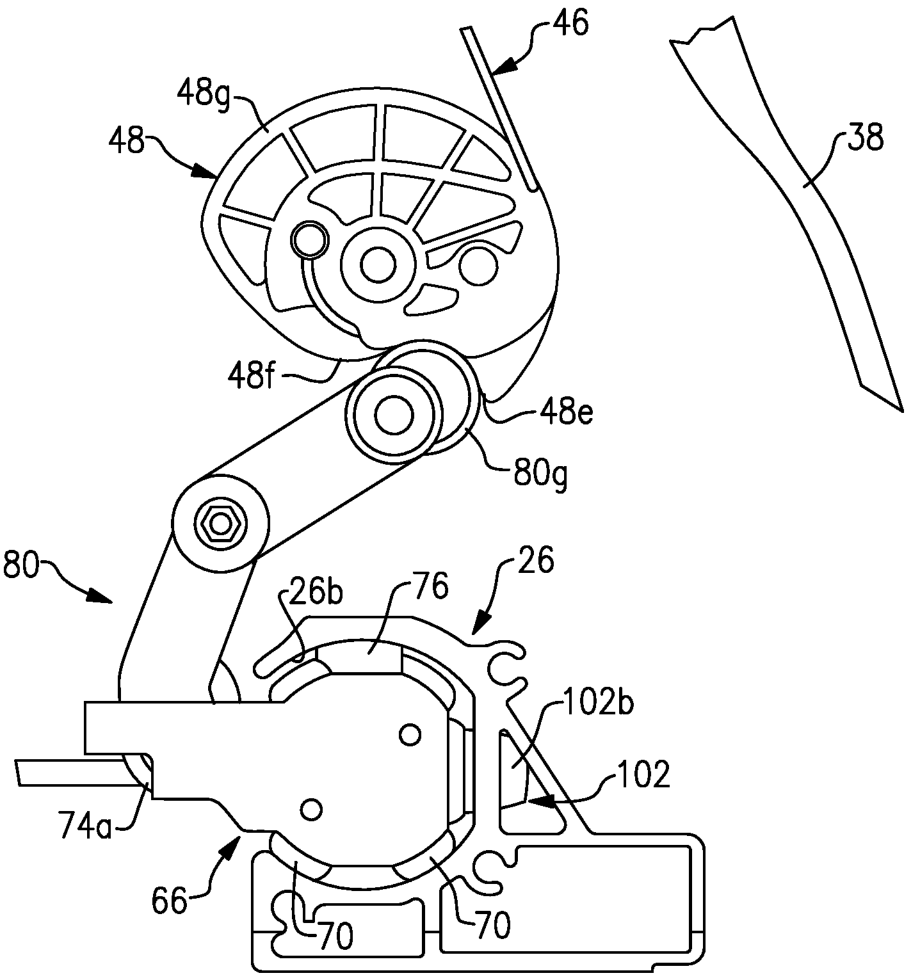
FIGS. 14-17 show a sequence of operation to illustrate the rotational orientation of the cam.

With brief reference to FIG. 13, it can be seen that the wedge actuators 74 each have an undersurface **74*d* with a recessed portion 74*e*. Within the recessed portion 74*e* is a tunable friction pad 74*f*. The pad 74*f* is made of material different than the remainder of the wedge actuator 74, and in particular the pad 74*f* has a higher coefficient of friction than the material providing the remainder of the wedge actuator 74, in this example. The pad 74*f* may be secured, for example, by a suitable adhesive. The pad 74*f* is optional. If the pad 74*f* is used, it may also be secured to the undersurface 74*d* without the use of the recessed portion 74*e*. The pad 74*f* may be made from a mixture of fibers held together with a resin, and the material used can include, without limitation, one of, or combinations of, Kevlar, carbon and rubber among other materials. The pad 74*f* can also possibly include metallic particles, copper or steel, that are fused together at a high temperature and pressure. The pad 74*f* forms a tunable friction surface which is constructed to provide a desired minimum coefficient of friction under all conditions. If the pad 74*f* is used, the coefficient of friction of the pad 74*f* needs to be such that it sufficiently counteracts the vertical downward force acting on the wedge actuator 74 once the block 76 is fully engaged with the interior wall of the support track 26, which tends to push the wedge actuator 74 toward the opening in the support track 26. However, the coefficient of friction cannot be so great that it significantly impedes smooth movement of the wedge actuator 74 along mating surfaces of the block 76 as the wedge actuators are being wedged during locking or unlocking movements of the moveable handle 38**.

Figure 15:
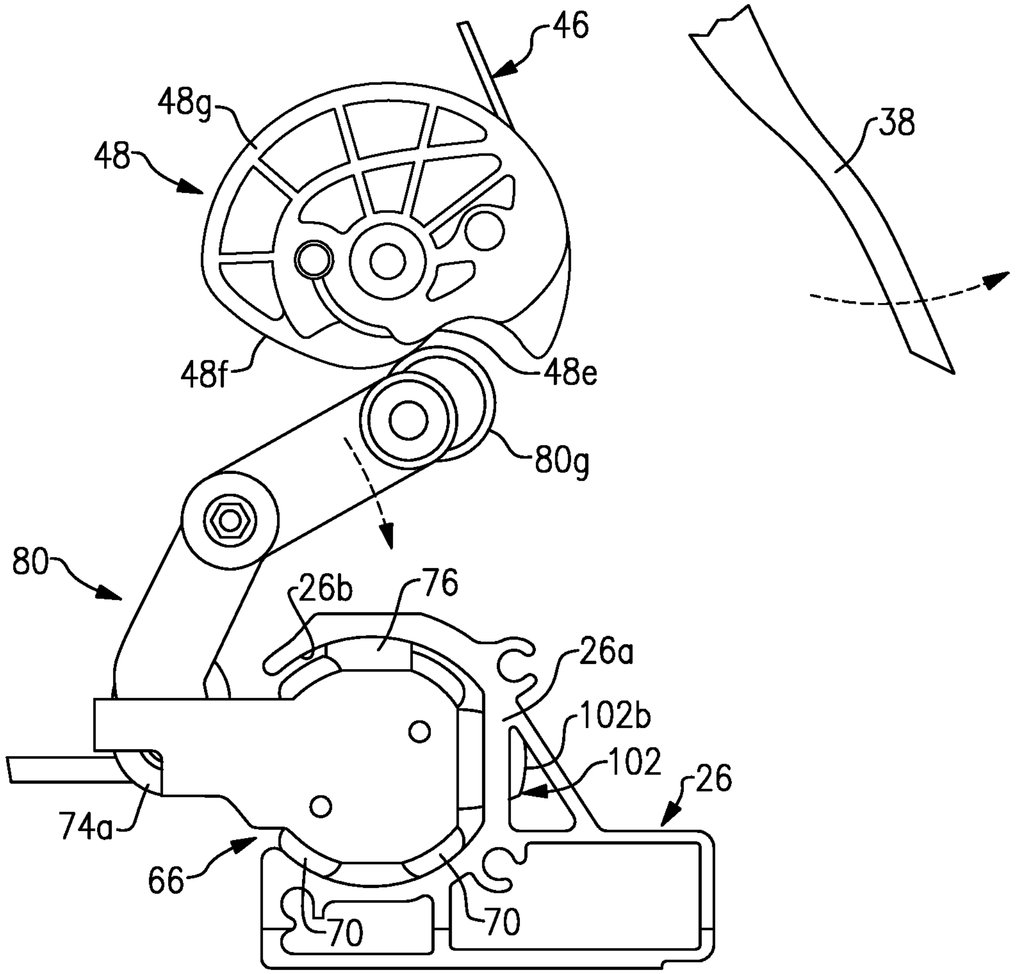
Figure 16:
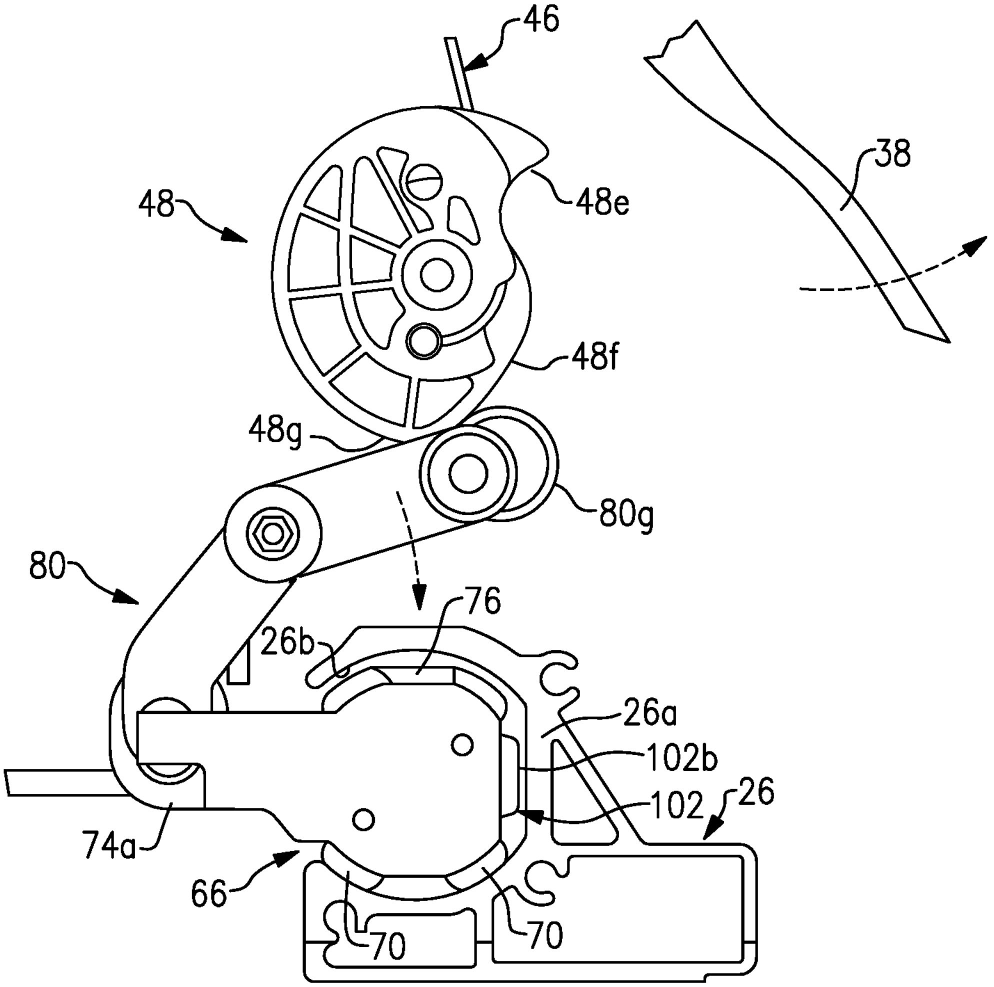
Figure 17:
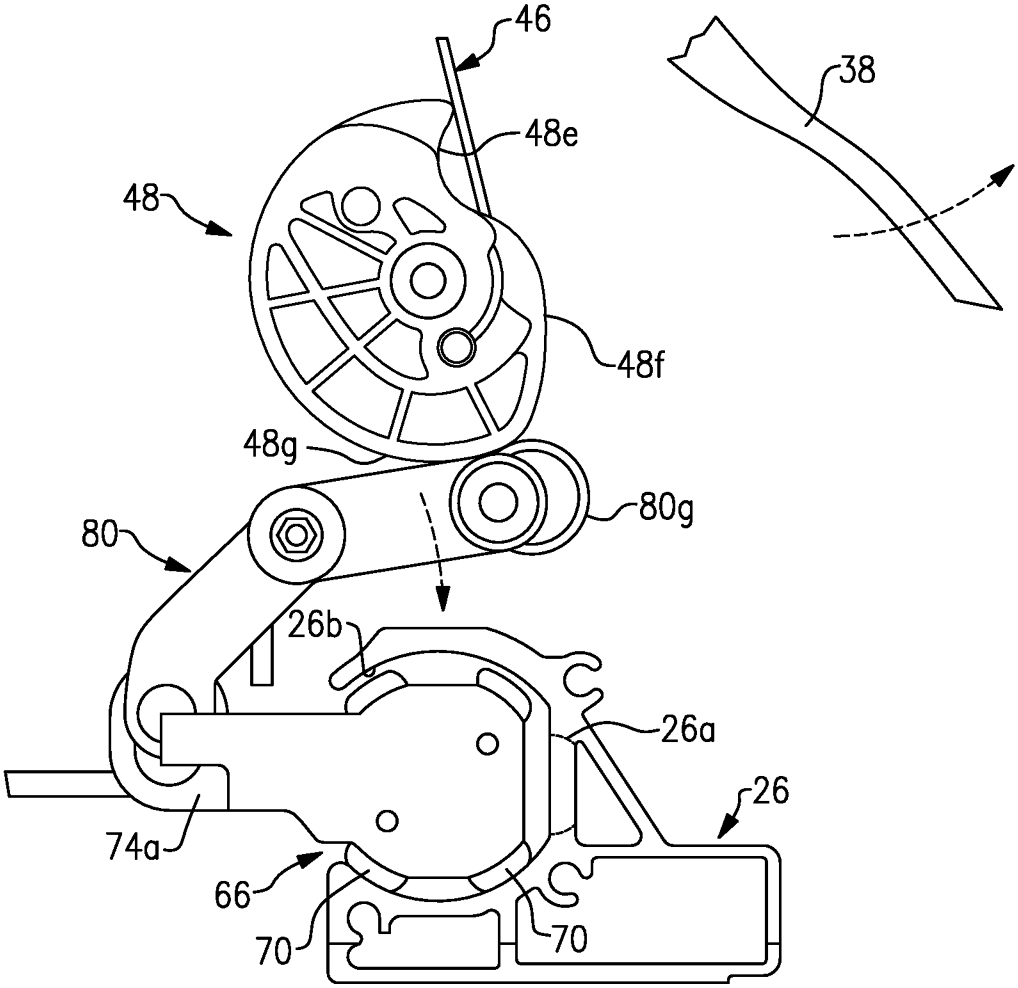

Referring now to FIGS. 14-17, a sequence of operations is illustrated to show the angular orientation of the cam 48, as well as the positions of the wedge actuator 74, the block 76, the locking pin 102 and moveable handle 38, as the moveable handle 38 is moved from its released position (FIG. 14) to the actuated position (FIG. 17). In the released position shown in FIG. 14, the curved section 48*e* of the cam 48 is in contact with the cam follower portion 80*g* of the second pivot bar 80, the block 76 is wedged into contact with an upper wall 26*b* of the support track 26, and the locking pin 102 is fully engaged in one of the holes 26*a* in the support track. As the moveable handle 38 is grasped by the user and squeezed toward the fixed handle 36, the cam follower portion 80*g* begins to ride out of curved section 48*e* onto another curved section 48*f* of the cam 48, as the second pivot bar 80 begins rotating in a counter-clockwise direction as shown in FIG. 15. Curved section 48*f* is convex when cam 48 is viewed from an exterior perspective. The locking pin 102 also begins its retracting movement and very slight retracting movement of the block 76 begins to occur. It will also be appreciated that in the beginning movement as described above for FIG. 15, the maximum force is generated when the cable 46 is pulled due to the shape of cam 48. The surface in contact with cam follower portion 80*g* is closer to the center pivot point than the cable 46, giving the user a mechanical advantage to overcome the friction of the wedge actuator 74 and the block 76. In practice, the cam 48 is designed with a shape to provide as much mechanical advantage as one desires, and this amount may be dictated in part on other components of the system.

In FIG. 16, as the cam 48 is rotated to a point where the cam follower portion 80*g* reaches the end of the curved section 48*f*, a small further amount of counter-clockwise rotation of the pivot bar 80 occurs, along with almost completely full retraction of the block 76 and the pivot pin 102. In FIG. 17, further squeezing action applied to the moveable handle 38 which moves the moveable handle 38 into the actuated position abutting (or almost abutting) the fixed handle 36, causes the curved section 48*g* of the cam 48 to move into contact with the cam follower portion 80*g*. Curved section 48*g* is convex when cam 48 is viewed from an exterior perspective. Curved section 48*g* exhibits a different contour than curved section 48*f*. Because of the eccentric construction of the cam 48, this provides a tangible "let off" of the gripping force being applied by the user needed to hold the moveable handle 38 in the fully unlocked position. At this point the block 76 and the locking pin 102 are both fully retracted within the body 68. The let off provided by the eccentric feature of cam 48 enables a significant reduction in the gripping force needed to maintain the moveable handle 38 in its fully unlocked position, relative to the gripping force needed to move the moveable handle 38 from its released/locked position, which enables the user to comfortably maintain the moveable handle 38 in the fully unlocked position as the rear support subsystem 24 is moved longitudinally along the support tracks 26 to a different position. A further advantage provided by the cam 48, and particularly curved section 48*g*, is that the cable 46 is not overtightened. Once the cam follower portion 80*g* reaches curved section 48*g* of the cam 48, further rotation of the cam will not cause further clockwise rotational movement of the second pivot bar 80, and thus no additional tension on the cable 46.

Figure 19:
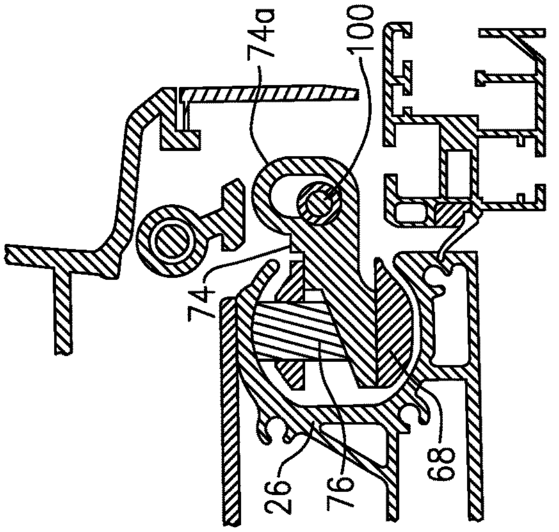
FIGS. 18-20 show simplified cross-sectional views of the trolley subsystem and further illustrate the positions of the wedge actuator and the block.
Figure 20:
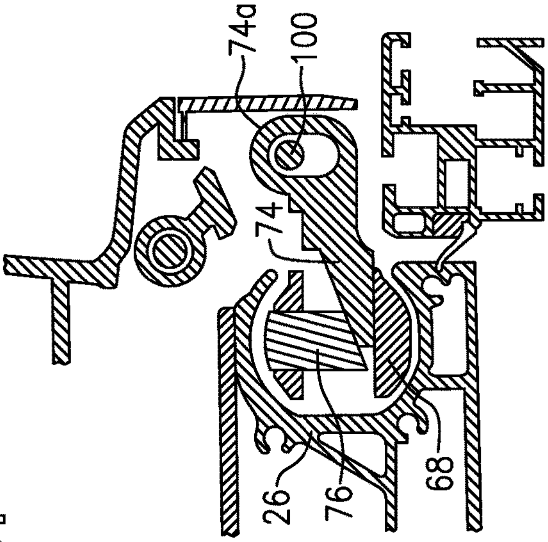
Figure 18:
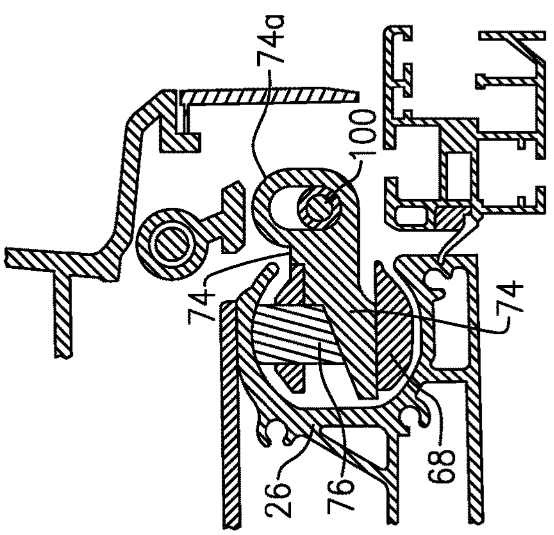

The positions of the wedge actuator 74 and the block 76 are further illustrated in FIGS. 18-20 as the moveable handle 38 is moved between the released position (FIG. 18) into the actuated position (FIG. 20).

Figure 21:
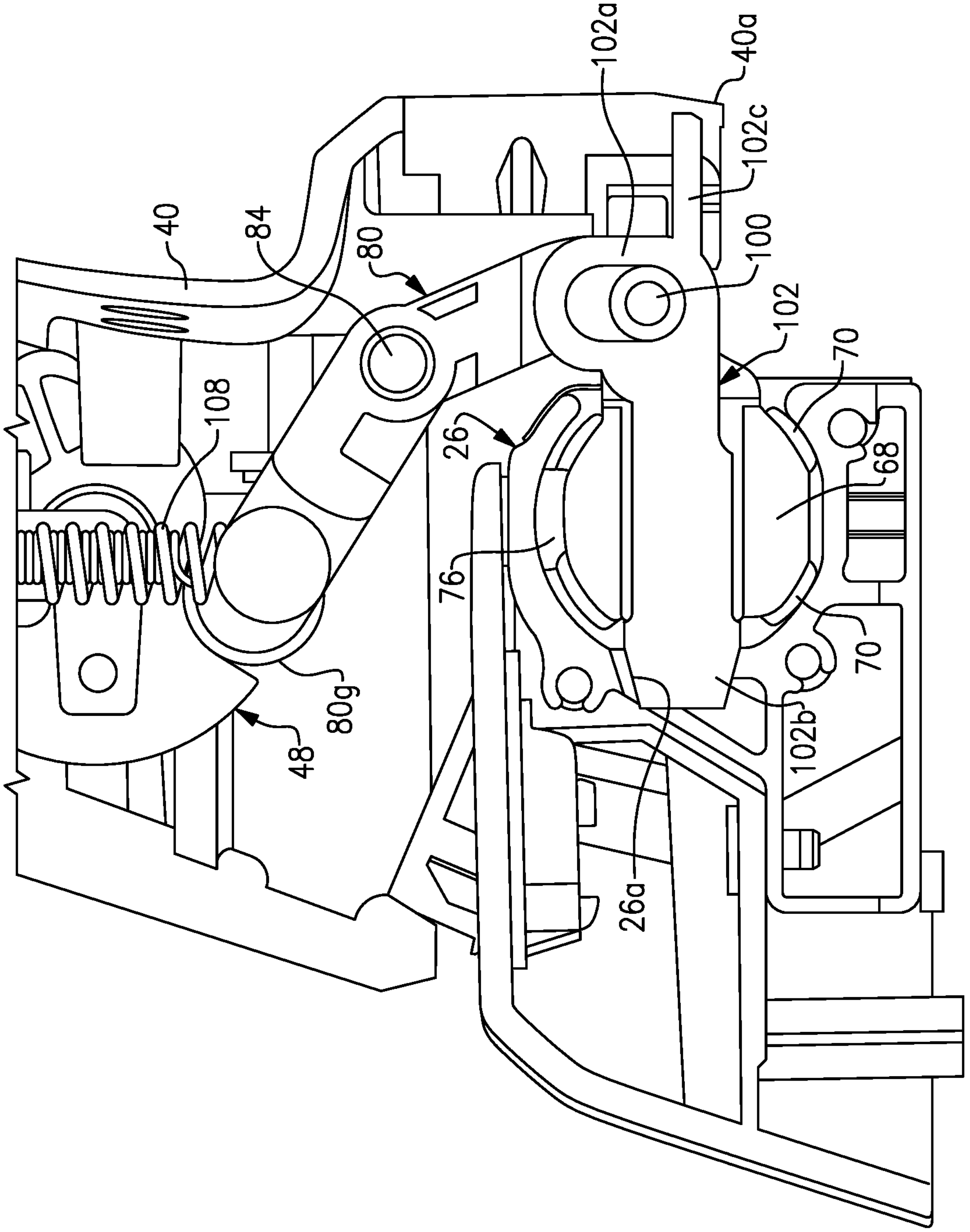
FIG. 21 shows a high level, side cross-sectional view of the locking pin showing an optional tongue section, and how the tongue section projects through an opening in the housing to provide a visual signal to the user when the locking pin is not engaged in one of the holes in the support track.

Referring now to FIG. 21, it can also be seen that the locking pin 102 optionally may include a tongue portion 102*c*. If incorporated on the locking pin 102, the tongue portion 102*c* is formed with a length so that it extends through an opening 40*a* in the housing 40 in a direction toward the truck bed 16 when the locking pin 102 is withdrawn (i.e., when the locking pin is in the unlocked orientation relative to the support track 26) so that it is clearly visible to a user, such as while the user is handling the moveable handle 38 and/or sliding the rear support subsystem 24. In this regard, the tongue portion 102*c* may be a conspicuous color different from the remainder of the rear support subsystem 24, such as a red color. While this feature is optional, it is useful in providing an indication to the user if the locking pin 102 is not fully engaged within one of the holes 26*a* in the track 26.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

In addition, the various figures accompanying this disclosure are not necessarily to scale, and some features may be exaggerated or minimized to show certain details of a particular component or arrangement.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The invention claimed is:

1. An article carrier system configured for use with a pickup truck, comprising:
- a rear support projecting above side walls of a cargo area of the pickup truck, wherein the rear support is slidable along the cargo area;
- a moveable handle configured to be grasped by a user, wherein the moveable handle is biased to a released position, and wherein, when a force is applied to the moveable handle, the moveable handle is configured to move to an actuated position;
- a cable moveable in response to movement of the moveable handle;
- a lock assembly configured to restrict movement of the rear support when the moveable handle is in the released position and to permit movement of the rear support when the moveable handle is in the actuated position;
- a cam, wherein the cam is configured to transmit movement of the cable to the lock assembly, and wherein the cam is configured to require a lesser force from the user to hold the moveable handle in the actuated position than to move the moveable handle from the released position;
- a torsion spring urging the cam in a direction that applies a force to the cable and the moveable handle such that the moveable handle is urged toward the released position, wherein the torsion spring includes a leg arranged in a well formed in the cam.

2. The article carrier system as recited in claim 1, further comprising:
- a track arranged along a side wall of the cargo area, wherein the track includes a plurality of openings; and
- a trolley connected to the rear support and arranged within the track, wherein the trolley includes a plurality of openings;
- wherein the lock assembly includes a locking pin supported by the trolley and configured to selectively project out of one of the openings of the trolley and into one of the openings of the track when the moveable handle is in the released position.

3. The article carrier system as recited in claim 1, wherein:
- the moveable handle is a first of two moveable handles configured to be grasped by a user,
- the moveable handles are arranged on opposite sides of the rear support,
- both moveable handles are biased to a released position, and
- when a force is applied to move either one of the moveable handles to an actuated position, the rear support is slidable along the side walls.

4. An article carrier system configured for use with a pickup truck, comprising:
- a rear support projecting above side walls of a cargo area of the pickup truck, wherein the rear support is slidable along the cargo area;
- a moveable handle configured to be grasped by a user, wherein the moveable handle is biased to a released position, and wherein, when a force is applied to the moveable handle, the moveable handle is configured to move to an actuated position;
- a cable moveable in response to movement of the moveable handle;
- a lock assembly configured to restrict movement of the rear support when the moveable handle is in the released position and to permit movement of the rear support when the moveable handle is in the actuated position; and
- a cam, wherein the cam is configured to transmit movement of the cable to the lock assembly, and wherein the cam is configured to require a lesser force from the user to hold the moveable handle in the actuated position than to move the moveable handle from the released position;
  - a track arranged along a side wall of the cargo area, wherein the track includes a plurality of openings;
- a trolley connected to the rear support and arranged within the track, wherein the trolley includes a plurality of openings, wherein the lock assembly includes a locking pin supported by the trolley and configured to selectively project out of one of the openings of the trolley and into one of the openings of the track when the moveable handle is in the released position;
  - a plurality of wedge actuators supported within horizontally-arranged openings of the trolley; and
  - a plurality of wedge blocks configured to interface with a corresponding one of the wedge actuators to selectively project out of a corresponding vertically-arranged opening of the trolley when the moveable handle is in the released position.

5. The article carrier system as recited in claim 4, wherein:
- each wedge block includes a bottom surface inclined at a non-parallel angle relative to a top surface thereof; and each wedge actuator includes a surface configured to engage the bottom surface of a corresponding wedge block and inclined such that horizontal movement of the wedge actuator results in vertical movement of the corresponding wedge block.

6. The article carrier system as recited in claim 5, wherein a bottom surface of each wedge actuator includes a pad of material different than a remainder of the wedge actuator.

7. The article carrier system as recited in claim 5, wherein a top surface of each wedge block is made of plastic.

8. The article carrier system as recited in claim 5, further comprising:

a first pivot bar connected to a first one of the wedge actuators;

a second pivot bar connected to the locking pin; and a third pivot bar connected to a second one of the wedge actuators, wherein the second pivot bar includes a cam follower configured to contact the cam, wherein the second pivot bar is arranged relative to the first and third pivot bars such that rotation of the second pivot bar by the cam is configured to rotate the first and third pivot bars.

9. The article carrier system as recited in claim 8, wherein:

the trolley includes first, second, third, and fourth rollers, each of the first, second, third, and fourth rollers is configured to rotate about a respective axis non-parallel relative to both a vertical axis of the track and a horizontal axis of the track, the first roller is adjacent a first end of the trolley, the second roller is between the first wedge actuator and the locking pin, the third roller is between the locking pin and the second wedge actuator, and the fourth roller is adjacent a second end of the trolley opposite the first end.

10. The article carrier system as recited in claim 8, wherein:

the cam includes a first curved section having a radius corresponding to a radius of the cam follower, and when the moveable handle is in the released position, the first curved section is in contact with the cam follower.

11. The article carrier system as recited in claim 10, wherein the first curved section is concave when the cam is viewed from an exterior perspective.

12. The article carrier system as recited in claim 10, wherein, when the first curved section is in contact with the cam follower, the locking pin is able to project into an opening in the track and first and second ones of the wedge blocks are urged into contact with an upper wall of the track by the first and second wedge actuators.

13. The article carrier system as recited in claim 10, wherein:

the cam includes a second curved section adjacent the first curved section, and when the cam is rotated such that the second curved section is in contact with the cam follower, the cam is configured to apply force to the locking pin to withdraw the locking pin from an opening in the track and to apply forces to the first and second wedge actuators such that first and second ones of the wedge blocks are spaced-apart from an upper wall of the track.

14. The article carrier system as recited in claim 13, wherein the second curved section is convex when the cam is viewed from an exterior perspective.

15. The article carrier system as recited in claim 13, wherein:

the cam includes a third curved section adjacent the second curved section, and when the cam is rotated such that the third curved section is in contact with the cam follower, the cam is configured to hold the locking pin such that the locking pin is withdrawn from an opening of the track and to hold the first and second wedge actuators such that the first and second wedge blocks are spaced-apart from the upper wall of the track.

16. The article carrier system as recited in claim 15, wherein:

the third curved section is convex when the cam is viewed from an exterior perspective, and the third curved section exhibits a different contour than the second curved section.

17. The article carrier system as recited in claim 4, wherein two rollers and one of the wedge blocks together provide three points of contact with the track when the moveable handle is in the released position, and wherein the three points of contact are spaced-apart from one another.

18. An article carrier system configured for use with a pickup truck, comprising:

a rear support projecting above side walls of a cargo area of the pickup truck, wherein the rear support is slidable along the cargo area;

a track extending along a side wall of the cargo area;

a trolley connected to the rear support and arranged within the track, wherein the trolley includes a plurality of rollers, wherein each of the rollers is configured to rotate about an axis non-parallel relative to both a vertical axis of the track and a horizontal axis of the track;

a moveable handle configured to be grasped by a user, wherein the moveable handle is biased to a released position, and wherein, when a force is applied to the moveable handle, the moveable handle is configured to move to an actuated position;

a cable moveable in response to movement of the moveable handle;

a lock assembly configured to restrict movement of the rear support when the moveable handle is in the released position and to permit movement of the rear support when the moveable handle is in the actuated position; and a cam, wherein the cam is configured to transmit movement of the cable to the lock assembly, and wherein the cam is configured to require a lesser force from the user to hold the moveable handle in the actuated position than to move the moveable handle from the released position.

19. The article carrier system as recited in claim 18, wherein each roller is configured to rotate about an axis that is a reflection of an axis of an immediately adjacent one of the rollers about the vertical axis.

20. The article carrier system as recited in claim 18, wherein each roller is configured to rotate about an axis inclined relative to the vertical axis by an amount within a range of 20° to 60°.

* * * * *